US008697807B2

(12) United States Patent
Demirors et al.

(10) Patent No.: US 8,697,807 B2
(45) Date of Patent: Apr. 15, 2014

(54) LONG CHAIN BRANCHED (LCB), BLOCK OR INTERCONNECTED COPOLYMERS OF ETHYLENE IN COMBINATION WITH ONE OTHER POLYMER

(71) Applicant: Dow Global Technologies LLC, Midland, MI (US)

(72) Inventors: Mehmet Demirors, Pearland, TX (US); Teresa P. Karjala, Lake Jackson, TX (US); Christopher R. Eddy, Lake Jackson, TX (US); Lonnie G. Hazlitt, Lake Jackson, TX (US); Pak-Meng Cham, Plano, TX (US); Sarat Munjal, Lake Jackson, TX (US); Wallace W. Yau, Las Vegas, NV (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/034,002

(22) Filed: Sep. 23, 2013

(65) Prior Publication Data

US 2014/0024775 A1    Jan. 23, 2014

Related U.S. Application Data

(62) Division of application No. 13/472,619, filed on May 16, 2012, now Pat. No. 8,541,519, which is a division of application No. 12/402,789, filed on Mar. 12, 2009, now Pat. No. 8,202,958.

(60) Provisional application No. 61/036,329, filed on Mar. 13, 2008.

(51) Int. Cl.
*C08F 8/00* (2006.01)
*C08L 23/04* (2006.01)

(52) U.S. Cl.
USPC ............................ 525/191; 525/193; 525/240

(58) Field of Classification Search
USPC .......................................... 525/191, 193, 240
See application file for complete search history.

(56) References Cited

U.S. PATENT DOCUMENTS

| | | | |
|---|---|---|---|
| 3,162,696 A | 12/1964 | Zimmerman et al. |
| 3,314,904 A | 4/1967 | Burkus |
| 4,026,967 A | 5/1977 | Flexman, Jr. et al. |
| 4,146,489 A | 3/1979 | Stambaugh et al. |
| 4,175,926 A | 11/1979 | Wisotsky |
| 4,565,844 A | 1/1986 | Kasahara et al. |
| 5,089,321 A | 2/1992 | Chum et al. |
| 5,278,272 A | 1/1994 | Lai et al. |
| 5,916,989 A | 6/1999 | Brookhart, III et al. |
| 6,114,457 A | 9/2000 | Markel et al. |
| 6,117,962 A | 9/2000 | Weng et al. |
| 6,147,180 A | 11/2000 | Markel et al. |
| 6,184,327 B1 | 2/2001 | Weng et al. |
| 6,262,203 B1 | 7/2001 | Chien et al. |
| 6,323,285 B1 | 11/2001 | Johnston et al. |
| 6,417,281 B1 | 7/2002 | Garcia-Franco et al. |
| 6,444,773 B1 | 9/2002 | Markel |
| 6,462,161 B1 | 10/2002 | Cady et al. |
| 6,660,809 B1 | 12/2003 | Weng et al. |
| 8,202,958 B2 | 6/2012 | Demirors et al. |
| 8,541,519 B2 | 9/2013 | Demirors et al. |
| 2003/0073783 A1 | 4/2003 | Kim et al. |
| 2004/0048989 A1 | 3/2004 | Wang et al. |
| 2004/0082722 A1 | 4/2004 | McLeod et al. |
| 2004/0198897 A1 | 10/2004 | Domine et al. |
| 2004/0214953 A1 | 10/2004 | Yamada et al. |
| 2004/0249093 A1 | 12/2004 | Lynch et al. |
| 2006/0093783 A1 | 5/2006 | De Clerck |
| 2010/0311937 A1 | 12/2010 | Tulloch |
| 2011/0021713 A1 | 1/2011 | Demirors et al. |
| 2011/0130533 A1 | 6/2011 | Karjala et al. |

FOREIGN PATENT DOCUMENTS

| | | |
|---|---|---|
| EP | 0128046 A1 | 12/1984 |
| EP | 0348200 A2 | 12/1989 |
| EP | 0729978 A1 | 9/1996 |
| EP | 0856541 A1 | 8/1998 |
| EP | 0856542 A1 | 8/1998 |
| EP | 0856545 A1 | 8/1998 |
| EP | 1162219 A1 | 12/2001 |
| EP | 1555292 A1 | 7/2005 |
| EP | 2254920 A1 | 12/2010 |
| GB | 1379853 A | 1/1975 |

(Continued)

OTHER PUBLICATIONS

NPL—Kaufman, "Radical-Mediated Modification of Polyolefins Investigation of the Synthesis of Graft Copolymers", M. S. Thesis in Chemical Engineering, Queens University, Kingston, Ontario, Canada, May 2008.
NPL—Luft at Darmstadt University in Angewandte Makromelekulare Chemie, vol. 188, p. 177-188 (1991).
NPL—Nordmeier et al. Macromolecules 1990, 23, 1072-1076.
PCT/US2009/036902, International Search Report and Written Opinion, Mailed Jun. 22, 2009.
PCT/2009/036902 International Preliminary Report on Patentability, issued Sep. 14, 2010.

*Primary Examiner* — Nathan M Nutter

(57) ABSTRACT

An ethylenic polymer comprising amyl groups from about 0.1 to about 2.0 units per 1000 carbon atoms as determined by Nuclear Magnetic Resonance and both a peak melting temperature, $T_m$, in ° C., and a heat of fusion, $H_f$, in J/g, as determined by DSC Crystallinity, where the numerical values of $T_m$ and $H_f$ correspond to the relationship $T_m \geq (0.2143*H_f) + 79.643$. An ethylenic polymer comprising at least one preparative TREF fraction that elutes at 95° C. or greater using a Preparative Temperature Rising Elution Fractionation method, where at least one preparative TREF fraction that elutes at 95° C. or greater has a gpcBR value greater than 0.05 and less than 5 as determined by gpcBR Branching Index by 3D-GPC, and where at least 5% of the ethylenic polymer elutes at a temperature of 95° C. or greater based upon the total weight of the ethylenic polymer.

4 Claims, 12 Drawing Sheets

(56) References Cited

FOREIGN PATENT DOCUMENTS

| | | | |
|---|---|---|---|
| WO | 95/27745 A1 | 10/1995 |
| WO | 95/27746 A1 | 10/1995 |
| WO | 98/34970 A1 | 8/1998 |
| WO | 98/34971 A1 | 8/1998 |
| WO | 99/29742 A1 | 6/1999 |
| WO | 00/37514 A1 | 6/2000 |
| WO | 02/057354 A2 | 7/2002 |
| WO | 2004/069887 A2 | 8/2004 |
| WO | 2007/056154 A2 | 5/2007 |

LONG CHAIN BRANCHED (LCB), BLOCK OR INTERCONNECTED COPOLYMERS OF ETHYLENE IN COMBINATION WITH ONE OTHER POLYMER

CROSS-REFERENCE TO RELATED APPLICATIONS

This application is a divisional of U.S. application Ser. No. 13/472,619, filed on May 16, 2012, and now U.S. Pat. No. 8,541,519, which is a divisional of U.S. application Ser. No. 12/402,789, filed on Mar. 12, 2009, now U.S. Pat. No. 8,202,958, which claims the priority benefit under 35 USC §119(e) to U.S. Provisional Patent Application No. 61/036,329, filed Mar. 13, 2008, the disclosure of which is incorporated herein by reference.

BACKGROUND OF THE INVENTION

There are many types of polyethylene made and sold today. Two types in particular are made by various suppliers and sold in large quantities. These two types are linear low density polyethylene (LLDPE) and high pressure free radical polyethylene (usually called LDPE). Sometimes polymer users blend these two types of polyethylene together to try to modify properties such as flowability or processability. However, this blending can also bring deficiencies in other physical properties. Thus, it would be advantageous to have similar mechanical properties to LLDPE and also the processability similar to that of LDPE.

We have now discovered new polymers which have the performance attributes of both LLDPE and LDPE.

SUMMARY OF THE INVENTION

In one embodiment, an ethylenic polymer is claimed comprising at least 0.1 amyl branches per 1000 carbon atoms as determined by Nuclear Magnetic Resonance and both a highest peak melting temperature, $T_m$, in ° C., and a heat of fusion, $H_f$, in J/g, as determined by DSC Crystallinity, where the numerical values of $T_m$ and $H_f$ correspond to the relationship:

$$T_m \geq (0.2143 * H_f) + 79.643, \text{ preferably } T_m \geq (0.2143 * H_f) + 81$$

and wherein the ethylenic polymer has less than about 1 mole percent hexene comonomer, and less than about 0.5 mole percent butene, pentene, or octene comonomer, preferably less than about 0.1 mole percent butene, pentene, or octene comonomer.

The ethylenic polymer can have a heat of fusion of the ethylenic polymer of less than about 170 J/g and/or a peak melting temperature of the ethylenic polymer of less than 126° C. Preferably the ethylenic polymer comprises no appreciable methyl and/or propyl branches as determined by Nuclear Magnetic Resonance. The ethylenic polymer preferably comprises no greater than 2.0 units of amyl groups per 1000 carbon atoms as determined by Nuclear Magnetic Resonance.

In another embodiment, an ethylenic polymer is claimed comprising at least one preparative TREF fraction that elutes at 95° C. or greater using a Preparative Temperature Rising Elution Fractionation method, where at least one preparative TREF fraction that elutes at 95° C. or greater has a branching level greater than about 2 methyls per 1000 carbon atoms as determined by Methyls per 1000 Carbons Determination on P-TREF Fractions, and where at least 5 weight percent of the ethylenic polymer elutes at a temperature of 95° C. or greater based upon the total weight of the ethylenic polymer.

In a third embodiment, an ethylenic polymer is claimed comprising at least one preparative TREF fraction that elutes at 95° C. or greater using a Preparative Temperature Rising Elution Fractionation method, where at least one preparative TREF fraction that elutes at 95° C. or greater has a g' value of less than 1, preferably less than 0.95, as determined by g' by 3D-GPC, and where at least 5 weight percent of the ethylenic polymer elutes at a temperature of 95° C. or greater based upon the total weight of the ethylenic polymer.

In a fourth embodiment, an ethylenic polymer is claimed comprising at least one preparative TREF fraction that elutes at 95° C. or greater using a Preparative Temperature Rising Elution Fractionation method, where at least one preparative TREF fraction that elutes at 95° C. or greater has a gpcBR value greater than 0.05 and less than 5 as determined by gpcBR Branching Index by 3D-GPC, and where at least 5 weight percent of the ethylenic polymer elutes at a temperature of 95° C. or greater based upon the total weight of the ethylenic polymer.

In a fifth embodiment, an ethylenic polymer is claimed comprising at least one preparative TREF fraction that elutes at 90° C. or greater using a Preparative Temperature Rising Elution Fractionation method, where at least one preparative TREF fraction that elutes at 90° C. or greater has a branching level greater than about 2 methyls per 1000 carbon atoms as determined by Methyls per 1000 Carbons Determination on P-TREF Fractions, and where at least 7.5 weight percent of the ethylenic polymer elutes at a temperature of 90° C. or greater based upon the total weight of the ethylenic polymer.

In a sixth embodiment, an ethylenic polymer is claimed comprising at least one preparative TREF fraction that elutes at 90° C. or greater using a Preparative Temperature Rising Elution Fractionation method, where at least one preparative TREF fraction that elutes at 90° C. or greater has a g' value of less than 1, preferably less than 0.95, as determined by g' by 3D-GPC, and where at least 7.5 weight percent of the ethylenic polymer elutes at a temperature of 90° C. or greater based upon the total weight of the ethylenic polymer.

In a seventh embodiment, an ethylenic polymer is claimed comprising at least one preparative TREF fraction that elutes at 90° C. or greater using a Preparative Temperature Rising Elution Fractionation method, where at least one preparative TREF fraction that elutes at 90° C. or greater has a gpcBR value greater than 0.05 and less than 5 as determined by gpcBR Branching Index by 3D-GPC, and where at least 7.5 weight percent of the ethylenic polymer elutes at a temperature of 90° C. or greater based upon the total weight of the ethylenic polymer.

Finally, a process for making such ethylenic polymers is claimed, said process comprising:

A) polymerizing ethylene in the presence of a catalyst to form a linear ethylene-based polymer having a crystallinity of at least 50% as determined by DSC Crystallinity in a first reactor or a first part of a multi-part reactor; and B) reacting the linear ethylene-based polymer with additional ethylene in the presence of a free-radical initiator to form an ethylenic polymer in at least one other reactor or a later part of a multi-part reactor.

Preferably, the reaction of step (B) occurs by graft polymerization.

Also preferably, the catalyst of step (A) can be a metallocene catalyst. If polar compounds are present in the reaction process, such as being present in the first reactor or the first part of a multi-part reactor, such polar compounds do not inhibit the activity of the metallocene catalyst.

DESCRIPTION OF THE DRAWINGS

The foregoing summary as well as the following detailed description will be better understood when read in conjunction with the appended drawings. It should be understood, however, that the invention is not limited to the precise arrangements and instrumentalities shown. The components in the drawings are not necessarily to scale, with emphasis instead being placed upon clearly illustrating the principles of the present invention. Moreover, in the drawings, like reference numerals designate corresponding parts throughout the several views.

FIGS. 13 (a & b) represent a 33:67 weight percent physical blend of Polymer 3 and Comparative Example 2. FIGS. 13 (c & d) represent 3D & 2D views, respectively, for an IR response curve of Example 5.

DETAILED DESCRIPTION

Figure 1A:
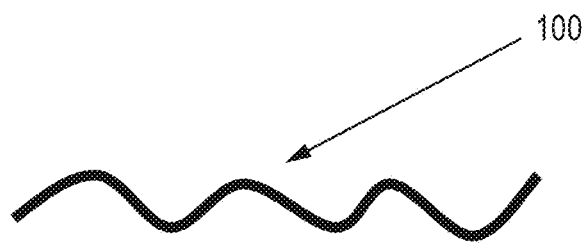
FIGS. 1A-D are schematics illustrating the steps of formation of the inventive ethylenic polymer 400 from a linear ethylene-based polymer 100.

The following discussion is presented to enable a person skilled in the art to make and use the disclosed compositions and methods. The general principles described may be applied to embodiments and applications other than those detailed without departing from the spirit and scope of the disclosed compositions and methods. The disclosed compositions and methods are not intended to be limited to the embodiments shown, but is to be accorded the widest scope consistent with the principles and features disclosed.

Currently, when a high crystallinity, ethylene-based polymer is used with a low crystallinity, highly long chain branched ethylene-based polymer, there is no mechanical means to create a blend that faithfully combines all the physical performance advantages of the ethylene-based polymer with the all the favorable processing characteristics of the highly long chain branched ethylene-based polymer. Disclosed are compositions and methods that address this shortcoming.

In order to achieve an improvement of physical properties over and above a mere physical blend of a ethylene-based polymer with a highly branched ethylene-based polymer, it was found that bonding the two separate constituents—an ethylene-based polymer and a highly long chain branched ethylene-based polymer—results in an ethylenic polymer material with physical properties akin to or better than the ethylene-based polymer component while maintaining processability characteristics akin to the highly long chain branched ethylene-based polymer component. It is believed that the disclosed ethylenic polymer structure is comprised of highly branched ethylene-based polymer substituents grafted to or free-radical polymerization generated ethylene-based long chain polymer branches originating from a radicalized site on the ethylene-based polymer. The disclosed composition is an ethylenic polymer comprised of an ethylene-based polymer with long chain branches of highly long chain branched ethylene-based polymer.

The combination of physical and processing properties for the disclosed ethylenic polymer is not observed in mere blends of ethylene-based polymers with highly long chain branched ethylene-based polymers. The unique chemical structure of the disclosed ethylenic polymer is advantageous as the ethylene-based polymer and the highly long chain branched ethylene-based polymer substituent are linked. When bonded, the two different crystallinity materials produce a polymer material different than a mere blend of the constituents. The combination of two different sets of branching and crystallinity materials results in an ethylenic polymer with physical properties that are better than the highly long chain branched ethylene-based polymer and better processibility than the ethylene-based polymer.

The melt index of the disclosed ethylenic polymer may be from about 0.01 to about 1000 g/10 minutes, as measured by ASTM 1238-04 (2.16 kg and 190° C.).

Ethylene-Based Polymers

Suitable ethylene-based polymers can be prepared with Ziegler-Natta catalysts, metallocene or vanadium-based single-site catalysts, or constrained geometry single-site catalysts. Examples of linear ethylene-based polymers include high density polyethylene (HDPE) and linear low density polyethylene (LLDPE). Suitable polyolefins include, but are not limited to, ethylene/diene interpolymers, ethylene/α-olefin interpolymers, ethylene homopolymers, and blends thereof.

Suitable heterogeneous linear ethylene-based polymers include linear low density polyethylene (LLDPE), ultra low density polyethylene (ULDPE), and very low density polyethylene (VLDPE). For example, some interpolymers produced using a Ziegler-Natta catalyst have a density of about 0.89 to about 0.94 g/cm$^3$ and have a melt index ($I_2$) from about 0.01 to about 1,000 g/10 minutes, as measured by ASTM 1238-04 (2.16 kg and 190° C.). Preferably, the melt index ($I_2$) is from about 0.1 to about 50 g/10 minutes. Heterogeneous linear ethylene-based polymers may have a molecular weight distributions, $M_w/M_n$, from about 3.5 to about 4.5.

The linear ethylene-based polymer may comprise units derived from one or more α-olefin copolymers as long as there is at least 50 mole percent polymerized ethylene monomer in the polymer.

High density polyethylene (HDPE) may have a density in the range of about 0.94 to about 0.97 g/cm$^3$. HDPE is typically a homopolymer of ethylene or an interpolymer of ethylene and low levels of one or more α-olefin copolymers. HDPE contains relatively few branch chains relative to the various copolymers of ethylene and one or more α-olefin copolymers. HDPE can be comprised of less than 5 mole % of the units derived from one or more α-olefin comonomers Linear ethylene-based polymers such as linear low density polyethylene and ultra low density polyethylene (ULDPE) are characterized by an absence of long chain branching, in contrast to conventional low crystallinity, highly branched ethylene-based polymers such as LDPE. Heterogeneous linear ethylene-based polymers such as LLDPE can be prepared via solution, slurry, or gas phase polymerization of ethylene and one or more α-olefin comonomers in the presence of a Ziegler-Natta catalyst, by processes such as are disclosed in U.S. Pat. No. 4,076,698 (Anderson, et al.). Relevant discussions of both of these classes of materials, and their methods of preparation are found in U.S. Pat. No. 4,950,541 (Tabor, et al.).

An α-olefin comonomer may have, for example, from 3 to 20 carbon atoms. Preferably, the α-olefin comonomer may have 3 to 8 carbon atoms. Exemplary α-olefin comonomers include, but are not limited to, propylene, 1-butene, 3-methyl-1-butene, 1-pentene, 3-methyl-1-pentene, 4-methyl-1-pentene, 1-hexene, 1-heptene, 4,4-dimethyl-1-pentene, 3-ethyl-1-pentene, 1-octene, 1-nonene, 1-decene, 1-dodecene, 1-tetradecene, 1-hexadecene, 1-octadecene and 1-eicosene. Commercial examples of linear ethylene-based polymers that are interpolymers include ATTANE™ Ultra Low Density Linear Polyethylene Copolymer, DOWLEX™ Polyethylene Resins, and FLEXOMER™ Very Low Density Polyethylene, all available from The Dow Chemical Company.

A copolymer may incoporate an α,ω-olefin comonomer. Examples of straight-chain or branched acyclic diene compounds that may be used as an α,ω-olefin comonomer include 1,6-heptadiene, 1,7-octadiene, 1,8-nonadiene, 1,9-decadiene, 1,11-dodecadiene, 1,13-tetradecadiene, and lower alkyl substituted derivatives thereof; examples of the monocyclic alicyclic diene compounds include 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinyl-cyclooctane, 1,5-diallylcyclooctane, and lower alkyl substituted derivatives thereof. Other suitable dienes include bicyclo-(2,2,1)-hepta-2,5-diene (norbornadiene), the dimer of norbornadiene, and diolefins having two strained ring double bonds, such as the reaction product obtained by reacting 2,5-norbornadiene with cyclopentadienyl-1,4,4a,5,8,8a-hexahydro-1,4,5,8-dimethano-naphthalene. Compounds similar but resulting from the addition of more bridged ring units by further condensation with cyclopentadiene can also be used.

In a further aspect, when used in reference to an ethylene homopolymer (that is, a high density ethylene homopolymer not containing any comonomer and thus no short chain branches), the terms "homogeneous ethylene polymer" or "homogeneous linear ethylene polymer" may be used to describe such a polymer.

In one aspect, the term "substantially linear ethylene polymer" as used refers to homogeneously branched ethylene polymers that have long chain branching. The term does not refer to heterogeneously or homogeneously branched ethylene polymers that have a linear polymer backbone. For substantially linear ethylene polymers, the long chain branches have about the same comonomer distribution as the polymer backbone, and the long chain branches can be as long as about the same length as the length of the polymer backbone to which they are attached. The polymer backbone of substantially linear ethylene polymers is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

Homogeneously branched ethylene polymers are homogeneous ethylene polymers that possess short chain branches and that are characterized by a relatively high composition distribution breadth index (CDBI). That is, the ethylene polymer has a CDBI greater than or equal to 50 percent, preferably greater than or equal to 70 percent, more preferably greater than or equal to 90 percent and essentially lack a measurable high density (crystalline) polymer fraction.

The CDBI is defined as the weight percent of the polymer molecules having a co-monomer content within 50 percent of the median total molar co-monomer content and represents a comparison of the co-monomer distribution in the polymer to the co-monomer distribution expected for a Bernoullian distribution. The CDBI of polyolefins can be conveniently calculated from data obtained from techniques known in the art, such as, for example, temperature rising elution fractionation ("TREF") as described, for example, by Wild, et al., *Journal of Polymer Science*, Poly. Phys. Ed., Vol. 20, 441 (1982); L. D. Cady, "The Role of Comonomer Type and Distribution in LLDPE Product Performance," *SPE Regional Technical Conference*, Quaker Square Hilton, Akron, Ohio, 107-119 (Oct. 1-2, 1985); or in U.S. Pat. No. 4,798,081 (Hazlitt, et al.) and U.S. Pat. No. 5,008,204 (Stehling). However, the TREE technique does not include purge quantities in CDBI calculations. More preferably, the co-monomer distribution of the polymer is determined using $^{13}C$ NMR analysis in accordance with techniques described, for example, in U.S. Pat. No. 5,292,845 (Kawasaki, et al.) and by J. C. Randall in Rev. Macromol. Chem. Phys., C29, 201-317.

The terms "homogeneously branched linear ethylene polymer" and "homogeneously branched linear ethylene/α-olefin polymer" means that the olefin polymer has a homogeneous or narrow short branching distribution (that is, the polymer has a relatively high CDBI) but does not have long chain branching. That is, the linear ethylene-based polymer is a homogeneous ethylene polymer characterized by an absence of long chain branching. Such polymers can be made using polymerization processes (for example, as described by Elston) which provide a uniform short chain branching distribution (homogeneously branched). In the polymerization process described by Elston, soluble vanadium catalyst systems are used to make such polymers; however, others, such as Mitsui Petrochemical Industries and Exxon Chemical Company, have reportedly used so-called single site catalyst systems to make polymers having a homogeneous structure similar to polymer described by Elston. Further, Ewen, et al., and U.S. Pat. No. 5,218,071 (Tsutsui, et al.) disclose the use of metallocene catalysts for the preparation of homogeneously branched linear ethylene polymers. Homogeneously branched linear ethylene polymers are typically characterized as having a molecular weight distribution, $M_w/M_n$, of less than 3, preferably less than 2.8, more preferably less than 2.3.

In discussing linear ethylene-based polymers, the terms "homogeneously branched linear ethylene polymer" or "homogeneously branched linear ethylene/α-olefin polymer" do not refer to high pressure branched polyethylene which is known to those skilled in the art to have numerous long chain branches. In one aspect, the term "homogeneous linear ethylene polymer" generically refers to both linear ethylene homopolymers and to linear ethylene/α-olefin interpolymers. For example, a linear ethylene/α-olefin interpolymer possess short chain branching and the α-olefin is typically at least one $C_3$-$C_{20}$ α-olefin (for example, propylene, 1-butene, 1-pentene, 4-methyl-1-pentene, 1-hexene, and 1-octene).

The presence of long chain branching can be determined in ethylene homopolymers by using $^{13}C$ nuclear magnetic resonance (NMR) spectroscopy and is quantified using the method described by Randall (Rev. *Macromol. Chem. Phys.*, C29, V. 2&3, 285-297). There are other known techniques useful for determining the presence of long chain branches in ethylene polymers, including ethylene/1-octene interpolymers. Two such exemplary methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, for example, Zimm, G. H. and Stockmayer, W. H., *J. Chem. Phys.*, 17, 1301 (1949), and Rudin, A., *Modern Methods of Polymer Characterization*, John Wiley & Sons, New York (1991) 103-112.

In a further aspect, substantially linear ethylene polymers are homogeneously branched ethylene polymers and are disclosed in both U.S. Pat. Nos. 5,272,236 and 5,278,272 (both Lai, et al.). Homogeneously branched substantially linear ethylene polymers are available from The Dow Chemical Company of Midland, Mich. as AFFINITY™ polyolefin plastomers and ENGAGE™ polyolefin elastomers. Homogeneously branched substantially linear ethylene polymers can be prepared via the solution, slurry, or gas phase polymerization of ethylene and one or more optional α-olefin comonomers in the presence of a constrained geometry catalyst, such as the method disclosed in European Patent 0416815 (Stevens, et al.).

The terms "heterogeneous" and "heterogeneously branched" mean that the ethylene polymer can be characterized as a mixture of interpolymer molecules having various ethylene to comonomer molar ratios. Heterogeneously branched linear ethylene polymers are available from The Dow Chemical Company as DOWLEX™ linear low density polyethylene and as ATTANE™ ultra-low density polyethylene resins. Heterogeneously branched linear ethylene polymers can be prepared via the solution, slurry or gas phase polymerization of ethylene and one or more optional α-olefin comonomers in the presence of a Ziegler Natta catalyst, by processes such as are disclosed in U.S. Pat. No. 4,076,698 (Anderson, et al.), Heterogeneously branched ethylene polymers are typically characterized as having molecular weight distributions, Mw/Mn, from about 3.5 to about 4.1 and, as such, are distinct from substantially linear ethylene polymers and homogeneously branched linear ethylene polymers in regards to both compositional short chain branching distribution and molecular weight distribution.

The Brookfield viscosity of the ethylene-based polymers is from about 20 to about 55,000,000 cP as measured at 177° C. using the Brookfield Viscosity method as described in the Test Methods section.

Overall, the high crystallinity, ethylene-based polymers have a density of greater than or equal to about 0.89 g/cm3, preferably greater than or equal to about 0.91 g/cm3, and preferably less than or equal to about 0.97 g/cm3. Preferably, these polymers have a density from about 0.89 to about 0.97 g/cm3. All densities are determined by the Density method as described in the Test Methods section.

Highly Long Chain Branched Ethylene-Based Polymers

Highly long chain branched ethylene-based polymers, such as low density polyethylene (LDPE), can be made using a high-pressure process using free-radical chemistry to polymerize ethylene monomer. Typical polymer density is from about 0.91 to about 0.94 g/cm$^3$. The low density polyethylene may have a melt index ($I_2$) from about 0.01 to about 150 g/10 minutes. Highly long chain branched ethylene-based polymers such as LDPE may also be referred to as "high pressure ethylene polymers", meaning that the polymer is partly or entirely homopolymerized or copolymerized in autoclave or tubular reactors at pressures above 13,000 psig with the use of free-radical initiators, such as peroxides (see, for example, U.S. Pat. No. 4,599,392 (McKinney, et al.)). The process creates a polymer with significant branches, including long chain branches.

Highly long chain branched ethylene-based polymers are typically homopolymers of ethylene; however, the polymer may comprise units derived from one or more α-olefin copolymers as long as there is at least 50 mole percent polymerized ethylene monomer in the polymer.

Comonomers that may be used in forming highly branched ethylene-based polymer include, but are not limited to, α-olefin comonomers, typically having no more than 20 carbon atoms. For example, the α-olefin comonomers, for example, may have 3 to 10 carbon atoms; or in the alternative, the α-olefin comonomers, for example, may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In the alternative, exemplary comonomers include, but are not limited to α,β-unsaturated $C_3$-$C_8$-carboxylic acids, in particular maleic acid, fumaric acid, itaconic acid, acrylic acid, methacrylic acid and crotonic acid derivates of the α,β-unsaturated $C_3$-$C_8$-carboxylic acids, for example unsaturated $C_3$-$C_{15}$-carboxylic acid esters, in particular ester of $C_1$-$C_6$-alkanols, or anhydrides, in particular methyl methacrylate, ethyl methacrylate, n-butyl methacrylate, ter-butyl methacrylate, methyl acrylate, ethyl acrylate n-butyl acrylate, 2-ethylhexyl acrylate, tert-butyl acrylate, methacrylic anhydride, maleic anhydride, and itaconic anhydride. In another alternative, the exemplary comonomers include, but are not limited to, vinyl carboxylates, for example vinyl acetate. In another alternative, exemplary comonomers include, but are not limited to, n-butyl acrylate, acrylic acid and methacrylic acid.

Process

The ethylene-based polymer may be produced before or separately from the reaction process with the highly branched ethylene-based polymer. In other disclosed processes, the ethylene-based polymer may be formed in situ and in the presence of highly branched ethylene-based polymer within a well-stirred reactor such as a tubular reactor or an autoclave reactor. The highly long chain branched ethylene-based polymer is formed in the presence of ethylene.

The ethylenic polymer is formed in the presence of ethylene. FIG. 1 give a general representation of free-radical ethylene polymerization to form a long chain branch from a radicalized linear ethylene-based polymer site of forming embodiment ethylenic polymers. Other embodiment processes for formation of the ethylene-based polymer, the substituent highly branched ethylene-based polymer, and their combination into the disclosed ethylenic polymer may exist.

In a first step of an embodiment process, an ethylene-based polymer 100, as shown in FIG. 1A, is formed. Ethylene-based polymer 100 may be formed by several different polymer processes, including, but not limited to, a gas-phase polymerization process, a slurry polymerization process, and a solution-based polymerization process. In some embodiments, the ethylene-based polymer 100 is formed in a separate process. Examples of polymers that may take the form of a ethylene-based polymer 100 include HDPE, LLDPE, ULDPE, and VLDPE.

Figure 1B:
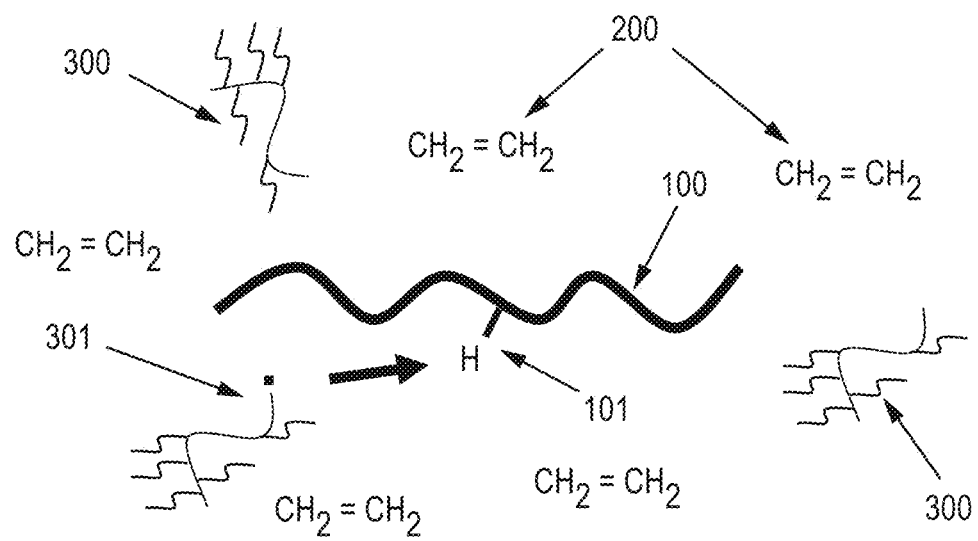

In a second step of an embodiment process, the ethylene-based polymer 100 further comprises an extractable hydrogen 101 as shown in FIG. 1B. The ethylene-based polymer 100 enters an area, such as a reactor, in which free-radical polymerization of ethylene monomer 200 into a highly long chain branched ethylene-based polymer 300 is supported.

At some point during this step, a free-radical bearing molecule, such as a peroxide initiator breakdown product or a growing, highly long chain branched ethylene-based polymer chain 301, interacts with the ethylene-based polymer 100 by extracting the extractable hydrogen 101 and transfers the free radical to the ethylene-based polymer 100. Methods for extracting the extractable hydrogen 101 from the ethylene-based polymer 100 include, but are not limited to, reaction with free radicals which are generated by homolytic ally cleaving molecules (for instance, peroxide-containing compounds or azo-containing compounds) or by external radiation.

Figure 1C:
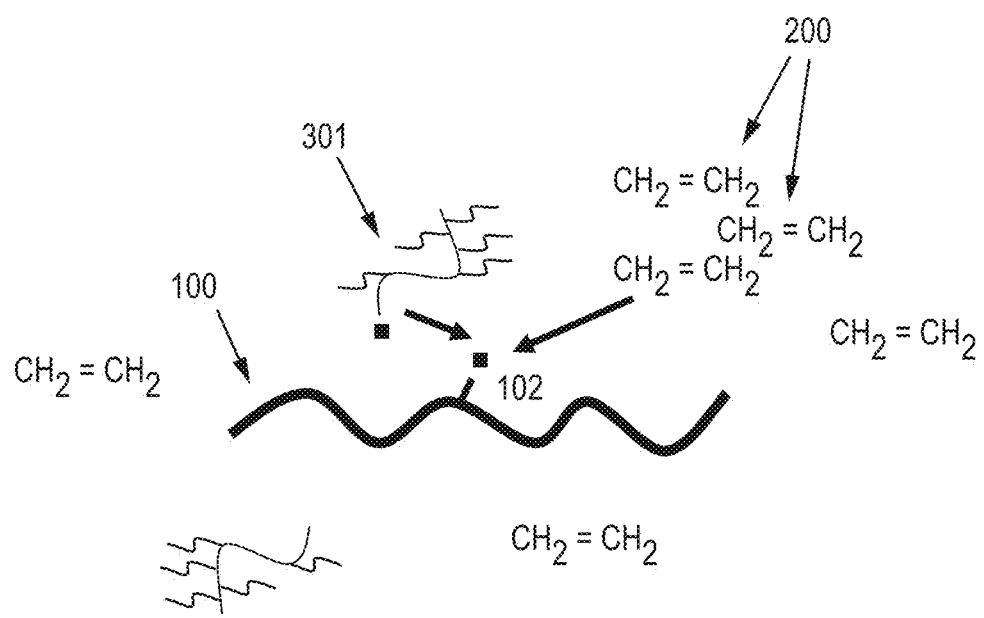

In a third step of an embodiment process, th ethylene-based polymer 100 further comprises a radicalized site 102 after hydrogen extraction, as shown in FIG. 1C. At this point in the process, and in the presence of ethylene, either a growing, highly long chain branched ethylene-based polymer chain 301 or ethylene monomer 200 interacts with the radicalized site 102 to attach to (via termination) or form a long chain branch (through polymerization). The reactions between FIGS. 1B and 1C may occur several times with the same ethylene-based polymer.

Figure 1D:
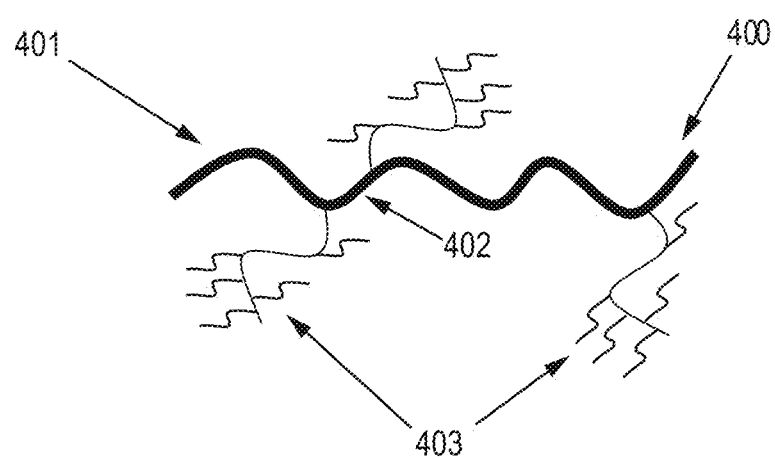

FIG. 1D shows a representation of an embodiment ethylenic polymer 400. Linear portion 401 of the embodiment ethylenic polymer 400 is the portion of the resultant polymer that does not contain a number of long chain branches 403. The branched portion 402 of the disclosed ethylenic polymer 400 is the portion of the resultant polymer that does contain a number of long chain branches 403.

In an embodiment process, the ethylene-based polymer is prepared externally to the reaction process used to form the embodiment ethylenic polymer, combined in a common reactor in the presence of ethylene under free-radical polymerization conditions, and subjected to process conditions and reactants to effect the formation of the embodiment ethylenic polymer.

In another embodiment process, the highly long chain branched ethylene-based polymer and the ethylene-based polymer are both prepared in different forward parts of the same process and are then combined together in a common downstream part of the process in the presence of ethylene under free-radical polymerization conditions. The ethylene-based polymer and the substituent highly long chain branched ethylene-based polymer are made in separate forward reaction areas or zones, such as separate autoclaves or an upstream part of a tubular reactor. The products from these forward reaction areas or zones are then transported to and combined in a downstream reaction area or zone in the presence of ethylene under free-radical polymerization conditions to facilitate the formation of an embodiment ethylenic polymer. In some processes, additional fresh ethylene is added to the process downstream of the forward reaction areas or zones to facilitate both the formation of and grafting of highly long chain branched ethylene-based polymers to the ethylene-based polymer and the reaction of ethylene monomer directly with the ethylene-based polymer to form the disclosed ethylenic polymer. In some other processes, at least one of the product streams from the forward reaction areas or zones is treated before reaching the downstream reaction area or zone to neutralize any residue or byproducts that may inhibit the downstream reactions.

In an embodiment in situ process, the ethylene-based polymer is created in a first or forward reaction area or zone, such as a first autoclave or an upstream part of a tubular reactor. The resultant product stream is then transported to a downstream reaction area or zone where there is a presence of ethylene at free-radical polymerization conditions. These conditions support both the formation of and grafting of highly long chain branched ethylene-based polymer to the ethylene-based polymer, thereby forming an embodiment ethylenic polymer. In some embodiment processes, free radical generating compounds are added to the downstream reaction area or zone to facilitate the grafting reaction. In some other embodiment processes, additional fresh ethylene is added to the process downstream of the forward reaction areas or zones to facilitate both the formation and grafting of highly long chain branched ethylene-based polymer to and the reaction of ethylene monomer with the ethylene-based polymer to form the disclosed ethylenic polymer. In some embodiment processes, the product stream from the forward reaction area or zone is treated before reaching the downstream reaction area or zone to neutralize any residue or byproducts from the previous reaction that may inhibit the highly branched ethylene-based polymer formation, the grafting of highly long chain branched ethylene-based polymer to the ethylene-based polymer, or the reaction of ethylene monomer with the ethylene-based polymer to form the disclosed ethylenic polymer.

For producing the ethylene-based polymer, a gas-phase polymerization process may be used. The gas-phase polymerization reaction typically occurs at low pressures with gaseous ethylene, hydrogen, a catalyst system, for example a titanium containing catalyst, and, optionally, one or more comonomers, continuously fed to a fluidized-bed reactor. Such a system typically operates at a pressure from about 300 to about 350 psi and a temperature from about 80 to about 100° C.

For producing the ethylene-based polymer, a solution-phase polymerization process may be used. Typically such a process occurs in a well-stirred reactor such as a loop reactor or a sphere reactor at temperature from about 150 to about 575° C., preferably from about 175 to about 205° C., and at pressures from about 30 to about 1000 psi, preferably from about 30 to about 750 psi. The residence time in such a process is from about 2 to about 20 minutes, preferably from about 10 to about 20 minutes. Ethylene, solvent, catalyst, and optionally one or more comonomers are fed continuously to the reactor. Exemplary catalysts in these embodiments include, but are not limited to, Ziegler-Natta, constrained geometry, and metallocene catalysts. Exemplary solvents include, but are not limited to, isoparaffins. For example, such solvents are commercially available under the name ISOPAR E (ExxonMobil Chemical Co., Houston, Tex.). The resultant mixture of ethylene-based polymer and solvent is then removed from the reactor and the polymer is isolated. Solvent is typically recovered via a solvent recovery unit, that is, heat exchangers and vapor liquid separator drum, and is recycled back into the polymerization system.

Any suitable method may be used for feeding the ethylene-based polymer into a reactor where it may be reacted with a highly long chain branched ethylene-based polymer. For example, in the cases where the ethylene-based polymer is produced using a gas phase process, the ethylene-based polymer may be dissolved in ethylene at a pressure above the highly long chain branched ethylene-based polymer reactor pressure, at a temperature at least high enough to dissolve the ethylene-based polymer and at concentration which does not lead to excessive viscosity before feeding to the highly long chain branched ethylene-based polymer reactor.

For producing the highly long chain branched ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from about 100 to about 3000 meters, preferably from about 1000 to about 2000 meters. The beginning of a reaction zone for either type of reactor is defined by the side injection of either initiator of the reaction, ethylene, telomer, comonomer(s) as well as any combination thereof. A high pressure process can be carried out in autoclave or tubular reactors or in a combination of autoclave and tubular reactors, each comprising one or more reaction zones.

In embodiment processes, the catalyst or initiator is injected prior to the reaction zone where free radical polymerization is to be induced. In other embodiment processes, the ethylene-based polymer may be fed into the reaction system at the front of the reactor system and not formed within the system itself. Termination of catalyst activity may be achieved by a combination of high reactor temperatures for the free radical polymerization portion of the reaction or by feeding initiator into the reactor dissolved in a mixture of a polar solvent such as isopropanol, water, or conventional initiator solvents such as branched or unbranched alkanes.

Embodiment processes may include a process recycle loop to improve conversion efficiency. In some embodiment processes, the recycle loop may be treated to neutralize residues or byproducts from the previous reaction cycle that may inhibit polymerization of either the ethylene-based polymer or the highly long chain branched ethylene-based polymer or inhibit the reaction forming the disclosed ethylenic polymer. In some embodiment processes, fresh monomer is added to this stream.

Ethylene used for the production of ethylene-based polymers or highly long chain branched ethylene-based polymer may be purified ethylene, which is obtained by removing polar components from a loop recycle stream or by using a reaction system configuration such that only fresh ethylene is used for making the ethylene-based polymers. It is not typical that purified ethylene is required to make highly long chain branched ethylene-based polymer. In such cases ethylene from the recycle loop may be used.

Embodiment processes may be used for either the homopolymerization of ethylene in the presence of an ethylene-based polymer or copolymerization of ethylene with one or more other comonomers in the presence of an ethylene-based polymer, provided that these monomers are copolymerizable with ethylene under free-radical conditions in high pressure conditions to form highly long chain branched ethylene-based polymers.

Chain transfer agents or telogens (CTA) are typically used to control the melt index in a free-radical polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. For high pressure free radical polymerizaton, these agents can be of many different types, such as saturated hydrocarbons, unsaturated hydrocarbons, aldehydes, ketones or alcohols. Typical CTAs that can be used include, but are not limited to, propylene, isobutane, n-butane, 1-butene, methyl ethyl ketone, propionaldehyde, ISOPAR (ExxonMobil Chemical Co.), and isopropanol. The amount of CTAs to use in the process is about 0.03 to about 10 weight percent of the total reaction mixture.

The melt index (MI or $I_2$) of a polymer, which is inversely related to the molecular weight, is controlled by manipulating the concentration of the chain transfer agent. For free radical polymerization, after the donation of a hydrogen atom, the CTA forms a radical which can react with the monomers, or with an already formed oligomers or polymers, to start a new polymer chain. This means that any functional groups present in the chain transfer agents will be introduced in the polymer chains. A large number of CTAs, for example, propylene and 1-butene which have an olefinically unsaturated bond, may also be incorporated in the polymer chain themselves, via a copolymerization reaction. Polymers produced in the presence of chain transfer agents are modified in a number of physical properties such as processability, optical properties such as haze and clarity, density, stiffness, yield point, film draw and tear strength.

Hydrogen has been shown to be a chain transfer agent for high pressure free radical polymerization and in the production of the high crytallinity ethylene-based polymer. Control of the molecular weight made in the reaction zones for disclosed processes may be accomplished by feeding hydrogen to the reaction zones where catalyst or initiator is injected. The final product melt index control would be accomplished by feeding chain transfer agents to the reaction zones where free radical polymerization takes place. Feed of the free radical chain transfer agents could be accomplished by direct injection into the reaction zones or by feeding them to the front of the reactor. In some embodiment processes, it may be necessary to remove excess CTA from the recycle stream or limit injection so as to prevent excess buildup of CTA in the front end of the process.

Free radical initiators that are generally used to produce ethylene-based polymers are oxygen, which is usable in tubular reactors in conventional amounts of between 0.0001 and 0.005 wt. % drawn to the weight of polymerizable monomer, and peroxides. Preferred initiators are t-butyl peroxy pivalate, di-t-butyl peroxide, t-butyl peroxy acetate and t-butyl peroxy-2-hexanoate or mixtures thereof. These organic peroxy initiators are used in conventional amounts of between 0.005 and 0.2 wt. % drawn to the weight of polymerizable monomers.

The peroxide initiator may be, for example, an organic peroxide. Exemplary organic peroxides include, but are not limited to, cyclic peroxides, diacyl peroxides, dialkyl peroxides, hydroperoxides, peroxycarbonates, peroxydicarbonates, peroxyesters, and peroxyketals.

Exemplary cyclic peroxides include, but are not limited to, 3,6,9-triethyl-3,6,9-trimethyl-1,4,7-triperoxonane. Such cyclic peroxides, for example, are commercially available under the tradename TRIGONOX 301 (Akzo Nobel; Arnhem, The Netherlands). Exemplary diacyl peroxides include, but are not limited to, di(3,5,5-trimethylhexanoyl) peroxide. Such diacyl peroxides, for example, are commercially available under the tradename TRIGONOX 36 (Akzo Nobel). Exemplary dialkyl peroxides include, but are not limited to, 2,5-dimethyl-2,5-di(tert-butylperoxy)hexane; 2,5-dimethyl-2,5-di(tert-butylperoxy)hexyne-3; di-tert-amyl peroxide; di-tert-butyl peroxide; and tert-butyl cumyl peroxide. Such dialkyl peroxides, for example, are commercially available under the tradenames TRIGONOX 101, TRIGONOX 145, TRIGONOX 201, TRIGONOX B, and TRIGONOX T (Akzo Nobel). Exemplary hydroperoxides include, but are not limited to, tert-Amyl hydroperoxide; and 1,1,3,3-tetramethylbutyl hydroperoxide. Such hydroperoxides, for example, are commercially available under the tradenames TRIGONOX TAHP, and TRIGONOX TMBH (Akzo Nobel). Exemplary peroxycarbonates include, but are not limited to, tert-butylperoxy 2-ethylhexyl carbonate; tert-amylperoxy 2-ethylhexyl carbonate; and tert-butylperoxy isopropyl carbonate. Such peroxycarbonates, for example, are commercially available under the tradenames TRIGONOX 117, TRIGONOX 131, and TRIGONOX BPIC (Akzo Nobel). Exemplary peroxydicarbonates include, but are not limited to, di(2-ethylhexyl) peroxydicarbonates; and di-sec-butyl peroxydicarbonates. Such peroxydicarbonates, for example, are commercially available under the tradename TRIGONOX EHP, and TRIGONOX SBP (Akzo Nobel). Exemplary peroxyesters include, but are not limited to, tert-amyl peroxy-2-ethylhexanoate; tert-amyl peroxyneodecanoate; tert-amyl peroxypivalate; tert-amyl peroxybenzoate; tert-amyl peroxyacetate; 2,5-dimethyl-2,5-di(2-ethylhexanoylperoxy)hexane; tert-butyl peroxy-2-ethylhexanoate; tert-butyl peroxyneodecanoate; tert-butyl peroxyneoheptanoate; tert-butyl peroxypivalate; tert-butyl peroxydiethylacetate; tert-butyl peroxyisobutyrate; 1,1,3,3-tetramethylbutyl peroxy-2-ethylhexanoate; 1,1,3,3-tetramethylbutyl peroxyneodecanoate; 1,1,3,3-tetramethylbutyl peroxypivalate; tert-butyl peroxy-3,5,5-trimethylhexanoate; cumyl peroxyneodecanoate; tert-butyl peroxybenzoate; and tert-butyl peroxyacetate. Such peroxyesters solvents, for example, are commercially available under the tradenames TRIGONOX 121; TRIGONOX 123; TRIGONOX 125; TRIGONOX 127; TRIGONOX 133; TRIGONOX 141; TRIGONOX 21; TRIGONOX 23; TRIGONOX 257; TRIGONOX 25; TRIGONOX 27; TRIGONOX 41; TRIGONOX 421; TRIGONOX 423; TRIGONOX 425; TRIGONOX 42; TRIGONOX 99; TRIGONOX C; and TRIGONOX F (Akzo Nobel). Exemplary peroxyketals include, but are not limited to, 1,1-di(tert-amylperoxy)cyclohexane; 1,1-di(tert-butylperoxy)cyclohexane; 1,1-di(tert-butylperoxy)-3,3,5-trimethylcyclohexane; and 2,2-di(tert-butylperoxy)butane. Such peroxyketals, for example, are commercially available under the tradenames TRIGONOX 122, TRIGONOX 22, TRIGONOX 29, and TRIGONOX D (Akzo Nobel). The free radical initiator system may, for example, include a mixture or combination of any of the aforementioned peroxide initiators. The peroxide initiator may comprise less than 60 percent by weight the free radical initiator system.

The free radical initiator system further includes at least one hydrocarbon solvent. The hydrocarbon solvent may, for example, be a $C_5$ to $C_{30}$ hydrocarbon solvent. Exemplary hydrocarbon solvents include, but are not limited to, mineral solvents, normal paraffinic solvents, isoparaffinic solvents, cyclic solvents, and the like. The hydrocarbon solvents may, for example, be selected from the group consisting of n-octane, iso-octane (2,2,4-trimethylpentane), n-dodecane, iso-dodecane (2,2,4,6,6-pentamethylheptane), and other isoparaffinic solvents. Exemplary hydrocarbon solvents such as isoparaffinic solvents, for example, are commercially available under the tradenames ISOPAR C, ISOPAR E, and ISOPAR H (ExxonMobil Chemical Co.). The hydrocarbon solvent may comprise less than 99 percent by weight of the free radical initiator system.

In some embodiment processes, the free radical initiator system may further include a polar co-solvent. The polar co-solvent may be an alcohol co-solvent, for example, a $C_1$ to $C_{30}$ alcohol. Additionally, the alcohol functionality of the alcohol co-solvent may, for example, be mono-functional or multi-functional. Exemplary alcohols as a polar co-solvent include, but are not limited to, isopropanol (2-propanol), allylalcohol (1-pentanol), methanol, ethanol, propanol, butanol, 1,4-butanediol, combinations thereof, mixtures thereof, and the like. The polar co-solvent may comprise less than 40 percent by weight of the free radical initiator system.

The polar co-solvent may be an aldehyde. Aldehydes are generally known to a person of skill in the art; for example, propionaldehyde may be used as a polar co-solvent. However, the reactivity potential of aldehydes as chain transfer agents should be taken into account when using such aldehydes as polar co-solvents. Such reactivity potentials are generally known to a person of skill in the art.

The polar co-solvent may be a ketone. Ketones are generally known to a person of skill in the art; for example, acetone or tetrahydrofuran may be used as polar co-solvents. However, the reactivity potential of ketones as chain transfer agents should be taken into account when using such ketones as polar co-solvents. Such reactivity potentials are generally known to a person of skill in the art.

In some embodiment processes, the free radical initiator system may further comprise a chain transfer agent as a solvent or as a blend for simultaneous injection. As previously discussed, chain transfer agents are generally known to a person of skill in the art, and they include, but are not limited to, propane, isobutane, acetone, propylene, isopropanol, butene-1, propionaldehyde, and methyl ethyl ketone. In other disclosed processes, chain transfer agent may be charged into the reactor via a separate inlet port from the initiator system. In another embodiment process, a chain transfer agent may be blended with ethylene, pressurized, and then injected into the reactor in its own injection system.

In some embodiment processes, a peroxide initiator may initially be dissolved or diluted in a hydrocarbon solvent, and then a polar co-solvent added to the peroxide initiator/hydrocarbon solvent mixture prior to metering the free radical initiator system into the polymerization reactor. In another embodiment process, a peroxide initiator may be dissolved in the hydrocarbon solvent in the presence of a polar co-solvent.

The free-radical initiator used in the process may initiate the graft site on the linear ethylene-based polymer by extracting the extractable hydrogen from the linear ethylene-based polymer. Example free-radical initiators include those free radical initiators previously discussed, such as peroxides and azo compounds. In some other embodiment processes, ionizing radiation may also be used to free the extractable hydrogen and create the radicalized site on the linear ethylene-based polymer. Organic initiators are preferred means of extracting the extractable hydrogen, such as using dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(tert-butyl peroxy)

hexane, lauryl peroxide, and tert-butyl peracetate, t-butyl α-cumyl peroxide, di-t-butyl peroxide, di-t-amyl peroxide, t-amyl peroxybenzoate, 1,1-bis(t-butylperoxy)-3,3,5-trimethylcyclohexane, α,α'-bis(t-butylperoxy)-1,3-diisopropylbenzene, α,α'-bis(t-butylperoxy)-1,4-diisopropylbenzene, 2,5-bis(t-butylperoxy)-2,5-dimethylhexane, and 2,5-bis(t-butylperoxy)-2,5-dimethyl-3-hexyne. A preferred azo compound is azobisisobutyl nitrite.

Suitable catalysts for use in embodiment processes include any compound or combination of compounds that is adapted for preparing polymers of the desired composition or type, either the ethylene-based polymers or the highly long chain branched ethylene-based polymers. Both heterogeneous and homogeneous catalysts, and combinations thereof, may be employed. In some embodiment processes, heterogeneous catalysts, including the well known Ziegler-Natta compositions, especially Group 4 metal halides supported on Group 2 metal halides or mixed halides and alkoxides and the well known chromium or vanadium based catalysts, may be used. In some embodiment processes, the catalysts for use may be homogeneous catalysts comprising a relatively pure organometallic compound or metal complex, especially compounds or complexes based on metals selected from Groups 3-10 or the Lanthanide series. If more than one catalyst is used in a system, it is preferred that any catalyst employed not significantly detrimentally affect the performance of another catalyst under the conditions of polymerization. Desirably, no catalyst is reduced in activity by greater than 25 percent, more preferably greater than 10 percent under the conditions of the polymerization. Examples of preferred catalyst systems may be found in U.S. Pat. No. 5,272,236 (Lai, et al.); U.S. Pat. No. 5,278,272 (Lai, et al.); U.S. Pat. No. 6,054,544 (Finlayson, et al.); U.S. Pat. No. 6,335,410 (Finlayson, et al.); and U.S. Pat. No. 6,723,810 (Finlayson, et al.); PCT Publication Nos. WO 2003/091262 (Boussie, et al.); 2007/136497 (Konze, et al.); 2007/136506 (Konze, et al.); 2007/136495 (Konze, et al.); and 2007/136496 (Aboelella, et al.). Other suitable catalysts may be found in U.S. Patent Publication No. 2007/0167578 (Arriola; et al.).

In some embodiment processes, a coordination-catalysis polymerization process may be used for the formation of the higher crystallinity linear ethylene-based polymer. In such embodiment processes, such catalyst systems would have a suitable tolerance to polar impurities that would result from impurities in the ethylene feed and degradation products from free-radical initiators. Control of the amount of polar impurities fed to the front portion of the reactor for the target catalyst efficiency could be accomplished by controlling the amount of polar solvent used in the initiator mixture and by the amount of material condensed in the process recycle streams. A type of coordination catalyst may include constrained geometry catalysts (CGC) as described in U.S. Pat. Nos. 5,272,236 and 5,278,272. Preferred catalysts in such a CGC system may include the general family of zirconium catalysts with biphenyl-phenol ligands, including bis((2-oxoyl-3-(1,1-dimethylethyl)phen-1-yl)-5-(methyl)phenyl)-2-phenoxy) propane-1,2-diylzirconium (IV) dimethyl and bis ((2-oxoyl-3-(dibenzo-1H-pyrrole-1-yl)-5-(methyl)phenyl)-2-phenoxy)-trans-cyclohexane-1,2-dimethylenyl-1,2-diylzirconium (IV) dimethyl, because they are known to have a good tolerance to polar impurities. Free radical initiators that generate carbon radicals reduce the amount of polar impurities in the system and potentially make the use of more conventional catalysts possible. Examples of carbon-centered free radical generators include azo compounds, including but not limited to, azo-bis-is-butyro-nitrile. Such compounds may have a half-life decomposition temperature of about 30 to about 250° C. Carbon-carbon initiators, examples of such include dimethyl diphenyl butane, dimethyl diphenyl hexane, and derivatives thereof, may be used to reach suitable half-life times under proscribed operating conditions.

In embodiment processes employing a complex metal catalyst, such a catalyst may be activated to form an active catalyst composition by combination with a cocatalyst, preferably a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. So-called modified methyl aluminoxane (MMAO) is also suitable for use as a cocatalyst. One technique for preparing such modified aluminoxane is disclosed in U.S. Pat. No. 5,041,584 (Crapo, et al.). Aluminoxanes can also be made as disclosed in U.S. Pat. No. 5,542,199 (Lai, et al.); U.S. Pat. No. 4,544,762 (Kaminsky, et al.); U.S. Pat. No. 5,015,749 (Schmidt, et al.); and U.S. Pat. No. 5,041,585 (Deavenport, et al.). Other preferred cocatalysts are inert, noncoordinating, boron compounds, such as perfluoroarylborane ($B(C_6F_5)_3$) and the class of compounds known as (bis-hydrogenated tallowalkyl)methylammonium tetrakis (pentafluorophenyl)borates, which are mixtures of complexes with the general chemical structure ($[R_2NCH_3]+[B(C_6F_5)_4]-$, wherein R may be a $C_{14}$, $C_{16}$ or $C_{18}$ alkyl. Other preferred cocatalysts may be found in U.S. Patent Publication No. 2007/0167578.

In some embodiment processes, processing aids, such as plasticizers, can also be included in the embodiment ethylenic polymer product. These aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils useful as processing aids include white mineral oil such as KAYDOL oil (Chemtura Corp.; Middlebury, Conn.) and SHELLFLEX 371 naphthenic oil (Shell Lubricants; Houston, Tex.). Another suitable oil is TUFFLO oil (Lyondell Lubricants; Houston, Tex.).

In some embodiment processes, embodiment ethylenic polymers are treated with one or more stabilizers, for example, antioxidants, such as IRGANOX 1010 and IRGAFOS 168 (Ciba Specialty Chemicals; Glattbrugg, Switzerland). In general, polymers are treated with one or more stabilizers before an extrusion or other melt processes. In other embodiment processes, other polymeric additives include, but are not limited to, ultraviolet light absorbers, antistatic agents, pigments, dyes, nucleating agents, fillers, slip agents, fire retardants, plasticizers, processing aids, lubricants, stabilizers, smoke inhibitors, viscosity control agents and anti-blocking agents. The embodiment ethylenic polymer composition may, for example, comprise less than 10 percent by the combined weight of one or more additives, based on the weight of the embodiment ethylenic polymer.

The embodiment ethylenic polymer may further be compounded. In some embodiment ethylenic polymer compositions, one or more antioxidants may further be compounded into the polymer and the compounded polymer pelletized. The compounded ethylenic polymer may contain any amount of one or more antioxidants. For example, the compounded ethylenic polymer may comprise from about 200 to about 600 parts of one or more phenolic antioxidants per one million parts of the polymer. In addition, the compounded ethylenic polymer may comprise from about 800 to about 1200 parts of a phosphite-based antioxidant per one million parts of polymer. The compounded disclosed ethylenic polymer may further comprise from about 300 to about 1250 parts of calcium stearate per one million parts of polymer.

Uses

The embodiment ethylenic polymer may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; and woven or non-woven fabrics. Thermoplastic compositions comprising the embodiment ethylenic polymer include blends with other natural or synthetic materials, polymers, additives, reinforcing agents, ignition resistant additives, antioxidants, stabilizers, colorants, extenders, crosslinkers, blowing agents, and plasticizers.

The embodiment ethylenic polymer may be used in producing fibers for other applications. Fibers that may be prepared from the embodiment ethylenic polymer or blends thereof include staple fibers, tow, multicomponent, sheath/core, twisted, and monofilament. Suitable fiber forming processes include spunbonded and melt blown techniques, as disclosed in U.S. Pat. No. 4,340,563 (Appel, et al.), U.S. Pat. No. 4,663,220 (Wisneski, et al.), U.S. Pat. No. 4,668,566 (Nohr, et al.), and U.S. Pat. No. 4,322,027 (Reba), gel spun fibers as disclosed in U.S. Pat. No. 4,413,110 (Kavesh, et al.), woven and nonwoven fabrics, as disclosed in U.S. Pat. No. 3,485,706 (May), or structures made from such fibers, including blends with other fibers, such as polyester, nylon or cotton, thermoformed articles, extruded shapes, including profile extrusions and co-extrusions, calendared articles, and drawn, twisted, or crimped yarns or fibers.

The embodiment ethylenic polymer may be used in a variety of films, including but not limited to clarity shrink films, collation shrink films, cast stretch films, silage films, stretch hooder films, sealants, and diaper backsheets.

The embodiment ethylenic polymer is also useful in other direct end-use applications. The embodiment ethylenic polymer is useful for wire and cable coating operations, in sheet extrusion for vacuum forming operations, and forming molded articles, including the use of injection molding, blow molding process, or rotomolding processes. Compositions comprising the embodiment ethylenic polymer can also be formed into fabricated articles using conventional polyolefin processing techniques.

Other suitable applications for the embodiment ethylenic polymer include elastic films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

Further treatment of the embodiment ethylenic polymer may be performed to apply the embodiment ethylenic polymer for other end uses. For example, dispersions (both aqueous and non-aqueous) can also be formed using the present polymers or formulations comprising the same. Frothed foams comprising the embodiment ethylenic polymer can also be formed, as disclosed in PCT Publication No. 2005/021622 (Strandeburg, et al.). The embodiment ethylenic polymer may also be crosslinked by any known means, such as the use of peroxide, electron beam, silane, azide, or other cross-linking technique. The embodiment ethylenic polymer can also be chemically modified, such as by grafting (for example by use of maleic anhydride (MAH), silanes, or other grafting agent), halogenation, amination, sulfonation, or other chemical modification.

Additives and adjuvants may be added to the embodiment ethylenic polymer post-formation. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; and other natural and synthetic polymers, including other polymers that are or can be made according to the embodiment methods.

Blends and mixtures of the embodiment ethylenic polymer with other polyolefins may be performed. Suitable polymers for blending with the embodiment ethylenic polymer include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene, including high pressure, free-radical LDPE, Ziegler-Natta LLDPE, metallocene PE, including multiple reactor PE ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.); U.S. Pat. No. 5,844,045 (Kolthammer, et al.); U.S. Pat. No. 5,869,575 (Kolthammer, et al.); and U.S. Pat. No. 6,448,341 (Kolthammer, et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company) and VISTAMAXX™ (ExxonMobil Chemical Co.)) can also be useful as components in blends comprising the embodiment ethylenic polymer.

Blends and mixtures of the embodiment ethylenic polymer may include thermoplastic polyolefin blends (TPO), thermoplastic elastomer blends (TPE), thermoplastic vulcanizates (TPV) and styrenic polymer blends. TPE and TPV blends may be prepared by combining embodiment ethylenic polymers, including functionalized or unsaturated derivatives thereof, with an optional rubber, including conventional block copolymers, especially an SBS block copolymer, and optionally a crosslinking or vulcanizing agent. TPO blends are generally prepared by blending the embodiment polymers with a polyolefin, and optionally a crosslinking or vulcanizing agent. The foregoing blends may be used in forming a molded object, and optionally crosslinking the resulting molded article. A similar procedure using different components has been previously disclosed in U.S. Pat. No. 6,797,779 (Ajbani, et al.).

DEFINITIONS

The term "composition," as used, includes a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "linear" refers to polymers where the polymer backbone of the polymer lacks measurable or demonstrable long chain branches, for example, the polymer is substituted with an average of less than 0.01 long branch per 1000 carbons.

The term "polymer" refers to a polymeric compound prepared by polymerizing monomers, whether of the same or a different type. The generic term polymer thus embraces the term "homopolymer," usually employed to refer to polymers prepared from only one type of monomer, and the term "interpolymer" as defined. The terms "ethylene/α-olefin polymer" is indicative of interpolymers as described.

The term "interpolymer" refers to polymers prepared by the polymerization of at least two different types of monomers. The generic term interpolymer includes copolymers, usually employed to refer to polymers prepared from two different monomers, and polymers prepared from more than two different types of monomers.

The term "ethylene-based polymer" refers to a polymer that contains more than 50 mole percent polymerized ethylene monomer (based on the total amount of polymerizable monomers) and, optionally, may contain at least one comonomer.

The term "ethylene/α-olefin interpolymer" refers to an interpolymer that contains more than 50 mole percent polymerized ethylene monomer (based on the total amount of polymerizable monomers) and at least one α-olefin.

The term "ethylenic polymer" refers to a polymer resulting from the bonding of an ethylene-based polymer and at least one highly long chain branched ethylene-based polymer.

Test Methods

Density

Samples that are measured for density are prepared according to ASTM D 1928. Measurements are made within one hour of sample pressing using ASTM D792, Method B.

For some highly long chain branched ethylene-based polymers, density is calculated ("calculated density") in grams per cubic centimeter based upon a relationship with the heat of fusion ($H_f$) in Joules per gram of the sample. The heat of fusion of the polymer sample is determined using the DSC Crystallinity method described infra.

To establish a relationship between density and heat of fusion for highly branched ethylene based polymers, thirty commercially available LDPE resins (designated "Commercially Available Resins" or "CAR") are tested for density, melt index ($I_2$), heat of fusion, peak melting temperature, g', gpcBR, and LCBf using the Density, Melt Index, DSC Crystallinity, Gel Permeation Chromatography, g' by 3D-GPC, and gpcBR Branching Index by 3D-GPC methods, all described infra. The Commercially Available Resins have the properties listed in Table 1.

TABLE 1

Properties for several Commercially Available Resins.

| Commercially Available Resins | Density (g/cm³) | Melt Index ($I_2$) (g/10 min) | Heat of Fusion (J/g) | Peak $T_m$ (° C.) | gpcBR Whole | g' avg | MH | LCBf |
|---|---|---|---|---|---|---|---|---|
| CAR1  | 0.920 | 0.15 | 147.2 | 110.9 | 1.26 | 0.56 | 0.48 | 2.05 |
| CAR2  | 0.922 | 2.5  | 151.1 | 111.4 | 0.89 | 0.62 | 0.49 | 2.03 |
| CAR3  | 0.919 | 0.39 | 146.8 | 110.4 | 1.19 | 0.56 | 0.50 | 2.39 |
| CAR4  | 0.922 | 0.80 | 155.0 | 112.5 | 0.78 | 0.61 | 0.50 | 1.99 |
| CAR5  | 0.916 | 28   | 139.3 | 106.6 | 1.27 | 0.59 | 0.44 | 3.59 |
| CAR6  | 0.917 | 6.4  | 141.5 | 107.8 | 1.48 | 0.56 | 0.45 | 3.24 |
| CAR7  | 0.924 | 1.8  | 155.1 | 112.2 | 0.77 | 0.63 | 0.51 | 1.84 |
| CAR8  | 0.926 | 5.6  | 157.9 | 113.4 | 0.57 | 0.67 | 0.54 | 1.64 |
| CAR9  | 0.923 | 0.26 | 151.4 | 110.3 | 1.13 | 0.58 | 0.51 | 2.06 |
| CAR10 | 0.924 | 0.22 | 151.2 | 111.4 | 1.03 | 0.58 | 0.50 | 1.96 |
| CAR11 | 0.924 | 0.81 | 154.1 | 112.3 | 0.95 | 0.58 | 0.50 | 2.48 |
| CAR12 | 0.926 | 5.9  | 158.0 | 113.1 | 0.70 | 0.66 | 0.50 | 1.90 |
| CAR13 | 0.924 | 2.0  | 155.2 | 111.8 | 0.84 | 0.61 | 0.49 | 2.03 |
| CAR14 | 0.923 | 4.1  | 157.3 | 111.6 | 1.26 | 0.60 | 0.38 | 2.32 |
| CAR15 | 0.922 | 33   | 153.5 | 111.8 | 0.46 | 0.69 | 0.27 | 1.95 |
| CAR16 | 0.922 | 4.1  | 151.0 | 109.3 | 1.89 | 0.57 | 0.34 | 2.61 |
| CAR17 | 0.918 | 0.46 | 141.2 | 107.4 | 3.09 | 0.46 | 0.39 | 3.33 |
| CAR18 | 0.921 | 2.1  | 145.9 | 110.2 | 0.85 | 0.60 | 0.41 | 2.11 |
| CAR19 | 0.918 | 8.2  | 143.2 | 106.4 | 2.27 | 0.54 | 0.33 | 3.20 |
| CAR20 | 0.922 | 0.67 | 148.7 | 110.4 | 0.68 | 0.62 | 0.42 | 1.59 |
| CAR21 | 0.924 | 0.79 | 154.2 | 111.8 | 0.74 | 0.60 | 0.48 | 1.96 |
| CAR22 | 0.922 | 0.25 | 150.0 | 110.5 | 0.92 | 0.57 | 0.47 | 1.92 |
| CAR23 | 0.924 | 3.4  | 153.6 | 111.3 | 0.65 | 0.63 | 0.48 | 1.94 |
| CAR24 | 0.921 | 4.6  | 148.2 | 106.9 | 1.49 | 0.58 | 0.36 | 2.54 |
| CAR25 | 0.923 | 20   | 150.9 | 108.9 | NM   | NM   | NM   | 2.21 |
| CAR26 | 0.925 | 1.8  | 157.5 | 112.4 | 0.82 | 0.64 | 0.50 | 1.86 |
| CAR27 | 0.923 | 0.81 | 153.7 | 111.5 | 0.87 | 0.62 | 0.50 | 1.94 |
| CAR28 | 0.919 | 6.8  | 145.1 | 105.7 | 1.72 | 0.57 | 0.36 | 2.75 |
| CAR29 | 0.931 | 3.6  | 167.3 | 115.6 | NM   | NM   | NM   | NM   |
| CAR30 | 0.931 | 2.3  | 169.3 | 115.8 | NM   | NM   | NM   | NM   |

Note that "NM" means not measured.

Figure 2:
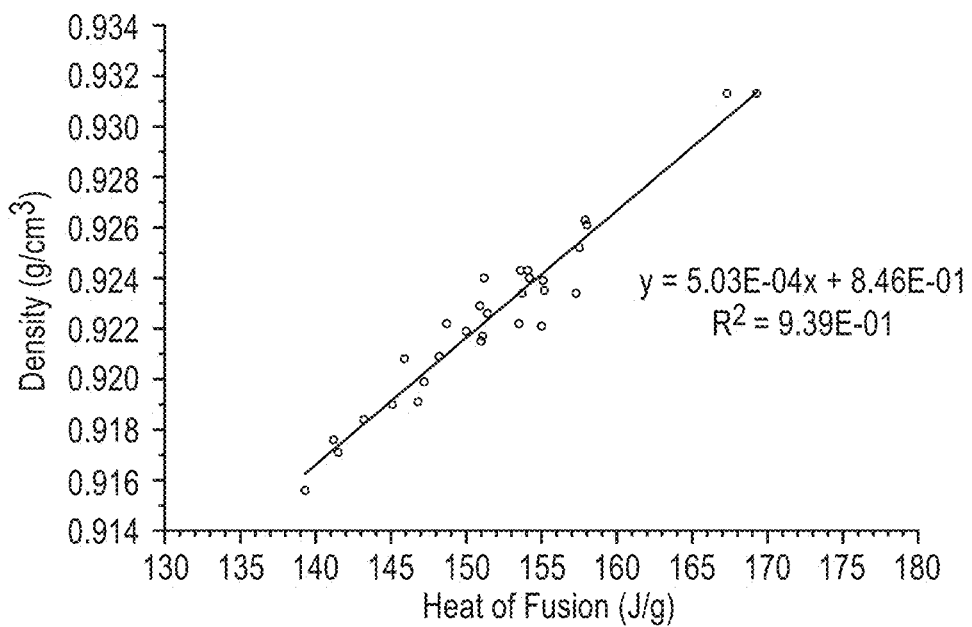
FIG. 2 is a plot of a relationship between density and heat of fusion for 30 Commercially Available Resins of low density polyethylene (LDPE).

A graph showing the relationship between density and heat of fusion ($H_f$) for the Commercially Available Resins is shown in FIG. 2. $R^2$ given in FIG. 2 is the square of a correlation coefficient between the observed and modeled data values. Based upon a linear regression, a calculated density, in grams per cubic centimeter, of commercially available highly long chain branched ethylene based polymers can be determined from the heat of fusion, in Joules per gram, using Equation 1:

Calculated density=$5.03E$-$04*(H_f)+8.46E$-$01$ (Eq. 1).

Melt Index

Melt index, or $I_2$, is measured in accordance with ASTM D 1238, Condition 190° C./2.16 kg, and is reported in grams eluted per 10 minutes. $I_{10}$ is measured in accordance with ASTM D 1238, Condition 190° C./10 kg, and is reported in grams eluted per 10 minutes.

Brookfield Viscosity

Melt viscosity is determined using a Brookfield Laboratories (Middleboro, Mass.) DVII+ Viscometer and disposable aluminum sample chambers. The spindle used is a SC-31 hot-melt spindle suitable for measuring viscosities from about 10 to about 100,000 centipoises. Other spindles may be used to obtain viscosities if the viscosity of the polymer is out of this range or in order to obtain the recommended torque ranges as described in this procedure. The sample is poured into the sample chamber, inserted into a Brookfield Thermosel, and locked into place. The sample chamber has a notch on the bottom that fits the bottom of the Brookfield Thermosel to ensure that the chamber is not allowed to turn when the spindle is inserted and spinning. The sample is heated to the required temperature (177° C.), until the melted sample is about 1 inch (approximately 8 grams of resin) below the top of the sample chamber. The viscometer apparatus is lowered and the spindle submerged into the sample chamber. Lowering is continued until brackets on the viscometer align on the Thermosel. The viscometer is turned on, and set to operate at a shear rate which leads to a torque reading from about 30 to about 60 percent. Readings are taken every minute for about 15 minutes or until the values stabilize, at which point, a final reading is recorded.

DSC Crystallinity

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for polyethylene samples using Equation 2:

% Crystallinity=$((H_f)/(292\ J/g))\times 100$ (Eq. 2).

The heat of fusion ($H_f$) and the peak melting temperature are reported from the second heat curve. Peak crystallization temperature is determined from the cooling curve.

Gel Permeation Chromatography (GPC)

The GPC system consists of a Waters (Milford, Mass.) 150 C high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene $M_w$ using the Mark-Houwink K and a (sometimes referred to as α) values mentioned later for polystyrene and polyethylene. See the Examples section for a demonstration of this procedure.

With 3D-GPC absolute weight average molecular weight ("$M_{w,\ Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102).

The systematic approach for the determination of multi-detector offsets is performed in a manner consistent with that published by Balke, Mourey, et al. (Mourey and Balke, Chromatography Polym., Chapter 12, (1992)) (Balke, Thitiratsakul, Lew, Cheung, Mourey, Chromatography Polym., Chapter 13, (1992)), optimizing triple detector log ($M_W$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume offset determination, are obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

Analytical Temperature Rising Elution Fractionation (ATREF)

ATREF analysis is conducted according to the methods described in U.S. Pat. No. 4,798,081 (Hazlitt, et al.) and Wild, L.; Ryle, T. R.; Knobeloch, D. C.; Peat, I. R.; "Determination of Branching Distributions in Polyethylene and Ethylene Copolymers", J. Polym. Sci., 20, 441-55 (1982). The configurations and equipment are described in Hazlitt, L. G., "Determination of Short-chain Branching Distributions of Ethylene Copolymers by Automated Temperature Rising Elution Fractionation (Auto-ATREF)", Journal of Applied Polymer Science: Appl. Polym. Symp., 45, 25-39 (1990). The polymer sample is dissolved in TCB (0.2% to 0.5% by weight) at 120° C. to 140° C., loaded on the column at an equivalent temperature, and allowed to crystallize in a column containing an inert support (stainless steel shot, glass beads, or a combination thereof) by slowly reducing the temperature to 20° C. at a cooling rate of 0.1° C./minute. The column is connected to an infrared detector (and, optionally, to a LALLS detector and viscometer) commercially available as described in the Gel Permeation Chromatography Method section. An ATREF chromatogram curve is then generated by eluting the crystallized polymer sample from the column while increasing the temperature (1° C./minute) of the column and eluting solvent from 20 to 120° C. at a rate of 1.0° C./minute.

Fast Temperature Rising Elution Fractionation (F-TREF)

The fast-TREF is performed with a Crystex instrument by Polymer ChAR (Valencia, Spain) in orthodichlorobenzene (ODCB) with IR-4 infrared detector in compositional mode (Polymer ChAR, Spain) and light scattering (LS) detector (Precision Detector Inc., Amherst, Mass.).

In F-TREF, 120 mg of the sample is added into a Crystex reactor vessel with 40 ml of ODCB held at 160° C. for 60 minutes with mechanical stirring to achieve sample dissolution. The sample is loaded onto TREF column. The sample solution is then cooled down in two stages: (1) from 160° C. to 100° C. at 40° C./minute, and (2) the polymer crystallization process started from 100° C. to 30° C. at 0.4° C./minute. Next, the sample solution is held isothermally at 30° C. for 30 minutes. The temperature-rising elution process starts from 30° C. to 160° C. at 1.5° C./minute with flow rate of 0.6 ml/minute. The sample loading volume is 0.8 ml. Sample molecular weight ($M_W$) is calculated as the ratio of the 15° or 90° LS signal over the signal from measuring sensor of IR-4 detector. The LS-MW calibration constant is obtained by using polyethylene national bureau of standards SRM 1484a. The elution temperature is reported as the actual oven temperature. The tubing delay volume between the TREF and detector is accounted for in the reported TREF elution temperature.

Preparative Temperature Rising Elution Fractionation (P-TREF)

The temperature rising elution fractionation method (TREF) used to preparatively fractionate the polymers (P-TREF) is derived from Wilde, L.; Ryle, T. R.; Knobeloch, D. C.; Peat, I. R.; "Determination of Branching Distributions in Polyethylene and Ethylene Copolymers", J. Polym. Sci., 20, 441-455 (1982), including column dimensions, solvent, flow and temperature program. An infrared (IR) absorbance detector is used to monitor the elution of the polymer from the column Separate temperature programmed liquid baths—one for column loading and one for column elution—are also used.

Samples are prepared by dissolution in trichlorobenzene (TCB) containing approximately 0.5% 2,6-di-tert-butyl-4-methylphenol at 160° C. with a magnetic stir bar providing agitation. Sample load is approximately 150 mg per column. After loading at 125° C., the column and sample are cooled to 25° C. over approximately 72 hours. The cooled sample and column are then transferred to the second temperature programmable bath and equilibrated at 25° C. with a 4 ml/minute constant flow of TCB. A linear temperature program is initiated to raise the temperature approximately 0.33° C./minute, achieving a maximum temperature of 102° C. in approximately 4 hours.

Fractions are collected manually by placing a collection bottle at the outlet of the IR detector. Based upon earlier ATREF analysis, the first fraction is collected from 56 to 60° C. Subsequent small fractions, called subfractions, are collected every 4° C. up to 92° C., and then every 2° C. up to 102° C. Subfractions are referred to by the midpoint elution temperature at which the subfraction is collected.

Subfractions are often aggregated into larger fractions by ranges of midpoint temperature to perform testing. For the purposes of testing embodiment ethylenic polymers, subfractions with midpoint temperatures in the range of 97 to 101° C. are combined together to give a fraction called "Fraction A". Subfractions with midpoint temperatures in the range of 90 to 95° C. are combined together to give a fraction called "Fraction B". Subfractions with midpoint temperatures in the range of 82 to 86° C. are combined together to give a fraction called "Fraction C". Subfractions with midpoint temperatures in the range of 62 to 78° C. are combined together to give a fraction called "Fraction D". Fractions may be further combined into larger fractions for testing purposes.

A weight-average elution temperature is determined for each Fraction based upon the average of the elution temperature range for each subfraction and the weight of the subfraction versus the total weight of the sample. Weight average temperature as determined by Equation 3 is defined as:

$$T_w = \sum_T T(f) * A(f) \Big/ \sum_T A(f),\qquad (Eq.\ 3)$$

where T(f) is the mid-point temperature of a narrow slice or segment and A(f) is the area of the segment, proportional to the amount of polymer, in the segment.

Data are stored digitally and processed using an EXCEL (Microsoft Corp.; Redmond, Wash.) spreadsheet. The TREF plot, peak maximum temperatures, fraction weight percentages, and fraction weight average temperatures were calculated with the spreadsheet program.

Post P-TREF Polymer Fraction Preparation

Fractions A, B, C, and D are prepared for subsequent analysis by removal of trichlorobenzene (TCB). This is a multi-step process in which one part TCB solution is combined with three parts methanol. The precipitated polymer for each fraction is filtered onto fluoropolymer membranes, washed with methanol, and air dried. The polymer-containing filters are then placed in individual vials with enough xylene to cover the filter. The vials are heated to 135° C., at which point the polymer either dissolves in the xylene or is lifted from the filter as plates or flakes. The vials are cooled, the filters are removed, and the xylene is evaporated under a flowing nitrogen atmosphere at room temperature. The vials are then placed in a vacuum oven, the pressure reduced to −28 inches Hg, and the temperature raised to 80° C. for two hours to remove residual xylene. The four Fractions are analyzed using IR spectroscopy and gel permeation chromatography to obtain a number average molecular weight. For IR analysis, Fractions may have to be combined into larger fractions to obtain a high enough signal to noise in the IR spectra.

Methyls Per 1000 Carbons Determination on P-TREF Fractions

The analysis follows Method B in ASTM D-2238 except for slight deviation in the procedure to account for smaller-than-standard sample sizes, as described in this procedure. In the ASTM procedure polyethylene films approximately 0.25 mm thick are scanned by infrared and analyzed. The procedure described is modified to permit similar testing using smaller amounts of material generated by the P-TREF separation.

For each of the Fractions, a piece of polymer is pressed between aluminum foil in a heated hydraulic press to create a film approximately 4 mm in diameter and 0.02 mm thick. The film is then placed on a NaCl disc 13 mm in diameter and 2 mm thick and scanned by infrared using an IR microscope. The FTIR spectrometer is a Thermo Nicolet Nexus 470 with a Continuum microscope equipped with a liquid nitrogen cooled MCT detector. One hundred twenty eight scans are collected at 2 wavenumber resolution using 1 level of 0 filling.

The methyls are measured using the 1378 cm$^{-1}$ peak. The calibration used is the same calibration derived by using ASTM D-2238. The FTIR is equipped with Thermo Nicolet Omnic software.

The uncorrected methyls per 1000 carbons, X, are corrected for chain ends using their corresponding number average molecular weight, $M_n$, to obtain corrected methyls per thousand, Y, as shown in Equation 4:

$$Y = X - 21,000/M_n \qquad (Eq.\ 4).$$

The value of 21,000 is used to allow for the lack of reliable signal to obtain unsaturation levels in the sub-fractions. In general, though, these corrections are small (<0.4 methyls per 1000 carbons).

g' by 3D-GPC

The index (g') for the sample polymer is determined by first calibrating the light scattering, viscosity, and concentration detectors described in the Gel Permeation Chromatography method supra with SRM 1475a homopolymer polyethylene (or an equivalent reference). The light scattering and viscometer detector offsets are determined relative to the concentration detector as described in the calibration. Baselines are subtracted from the light scattering, viscometer, and concentration chromatograms and integration windows are then set making certain to integrate all of the low molecular weight retention volume range in the light scattering and viscometer chromatograms that indicate the presence of detectable polymer from the refractive index chromatogram. A linear homopolymer polyethylene is used to establish a Mark-Houwink (MH) linear reference line by injecting a broad molecular weight polyethylene reference such as SRM1475a standard, calculating the data file, and recording the intrinsic viscosity (IV) and molecular weight ($M_W$), each derived from the light scattering and viscosity detectors respectively and the concentration as determined from the RI detector mass constant for each chromatographic slice. For the analysis of samples the procedure for each chromatographic slice is repeated to obtain a sample Mark-Houwink line. Note that for some samples the lower molecular weights, the intrinsic viscosity and the molecular weight data may need to be extrapolated such that the measured molecular weight and intrinsic viscosity asymptotically approach a linear homopolymer GPC calibration curve. To this end, many highly-branched ethylene-based polymer samples require that the linear reference line be shifted slightly to account for the contribution of short chain branching before proceeding with the long chain branching index (g') calculation.

A g-prime ($g_i'$) is calculated for each branched sample chromatographic slice (i) and measuring molecular weight ($M_i$) according to Equation 5:

$$g_i' = (IV_{sample,i}/IV_{linear\_reference,j}) \qquad (Eq.\ 5),$$

where the calculation utilizes the $IV_{linear\_reference,j}$ at equivalent molecular weight, $M_j$, in the linear reference sample. In other words, the sample IV slice (i) and reference IV slice (j) have the same molecular weight ($M_i = M_j$). For simplicity, the $IV_{linear\_reference,j}$ slices are calculated from a fifth-order polynomial fit of the reference Mark-Houwink Plot. The IV ratio, or $g_i'$, is only obtained at molecular weights greater than 3,500 because of signal-to-noise limitations in the light scattering data. The number of branches along the sample polymer ($B_n$) at each data slice (i) can be determined by using Equation 6, assuming a viscosity shielding epsilon factor of 0.75:

$$\left[\frac{IV_{Sample,i}}{IV_{linear\_reference,j}}\right]^{1.33}_{M_i=j} = \left[\left(1 + \frac{B_{n,i}}{7}\right)^{1/2} + \frac{4}{9}\frac{B_{n,i}}{\pi}\right]^{-1/2}. \qquad (Eq.\ 6)$$

Finally, the average LCBf quantity per 1000 carbons in the polymer across all of the slices (i) can be determined using Equation 7:

$$LCBf = \frac{\sum_{M=3500}^{i} \left(\frac{B_{n,i}}{M_i/14000} c_i\right)}{\sum c_i}.$$ (Eq. 7)

gpcBR Branching Index by 3D-GPC

In the 3D-GPC configuration the polyethylene and polystyrene standards can be used to measure the Mark-Houwink constants, K and α, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations ("cc") for polyethylene molecular weight and polyethylene intrinsic viscosity as a function of elution volume, as shown in Equations 8 and 9:

$$M_{PE} = \left(\frac{K_{PS}}{K_{PE}}\right)^{1/\alpha_{PE}+1} \cdot M_{PS}^{\alpha_{PS}+1/\alpha_{PE}+1},$$ (Eq. 8)

and $$[\eta]_{PE} = K_{PS} \cdot M_{PS}^{\alpha+1} / M_{PE}.$$ (Eq. 9)

The gpcBR branching index is a robust method for the characterization of long chain branching. See Yau, Wallace W., "Examples of Using 3D-GPC—TREF for Polyolefin Characterization", *Macromol. Symp.*, 2007, 257, 29-45. The index avoids the slice-by-slice 3D-GPC calculations traditionally used in the determination of g' values and branching frequency calculations in favor of whole polymer detector areas and area dot products. From 3D-GPC data, one can obtain the sample bulk $M_w$ by the light scattering (LS) detector using the peak area method. The method avoids the slice-by-slice ratio of light scattering detector signal over the concentration detector signal as required in the g' determination.

$$M_w = \sum_i w_i M_i = $$ (Eq. 10)

$$\sum_i \left(\frac{C_i}{\sum_i C_i}\right) M_i = \frac{\sum_i C_i M_i}{\sum_i C_i} = \frac{\sum_i LS_i}{\sum_i C_i} = \frac{LS \text{ Area}}{Conc. \text{ Area}}.$$

The area calculation in Equation 10 offers more precision because as an overall sample area it is much less sensitive to variation caused by detector noise and GPC settings on baseline and integration limits. More importantly, the peak area calculation is not affected by the detector volume offsets. Similarly, the high-precision sample intrinsic viscosity (IV) is obtained by the area method shown in Equation 11:

$$IV = [\eta] = \sum_i w_i IV_i = $$ (Eq. 11)

$$\sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP \text{ Area}}{Conc. \text{ Area}},$$

where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or $[\eta]$) of the sample.

Initially, the molecular weight and intrinsic viscosity for a linear polyethylene standard sample, such as SRM1475a or an equivalent, are determined using the conventional calibrations for both molecular weight and intrinsic viscosity as a function of elution volume, per Equations 12 and 13:

$$Mw_{CC} = \sum_i \left(\frac{C_i}{\sum_i C_i}\right) M_i = \sum_i w_i M_i,$$ (Eq. 12)

and $$[\eta]_{CC} = \sum_i \left(\frac{C_i}{\sum_i C_i}\right) IV_i = \sum_i w_i IV_i.$$ (Eq. 13)

Equation 14 is used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right],$$ (Eq. 14)

where $[\eta]$ is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The Mw by light scattering (LS) using Equation (10) is commonly referred to as the absolute Mw; while the Mw,cc from Equation (12) using the conventional GPC molecular weight calibration curve is often referred to as polymer chain Mw. All statistical values with the "cc" subscript are determined using their respective elution volumes, the corresponding conventional calibration as previously described, and the concentration ($C_i$) derived from the mass detector response. The non-subscripted values are measured values based on the mass detector, LALLS, and viscometer areas. The value of $K_{PE}$ is adjusted iteratively until the linear reference sample has a gpcBR measured value of zero. For example, the final values for α and Log K for the determination of gpcBR in this particular case are 0.725 and −3.355, respectively, for polyethylene, and 0.722 and −3.993 for polystyrene, respectively.

Once the K and α values have been determined, the procedure is repeated using the branched samples. The branched samples are analyzed using the final Mark-Houwink constants as the best "cc" calibration values and applying Equations 10-14.

The interpretation of gpcBR is straight forward. For linear polymers, gpcBR calculated from Equation 14 will be close to zero since the values measured by LS and viscometry will be close to the conventional calibration standard. For branched polymers, gpcBR will be higher than zero, especially with high levels of LCB, because the measured polymer $M_w$ will be higher than the calculated $M_{w,cc}$, and the calculated $IV_{cc}$ will be higher than the measured polymer IV. In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to the g' index and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also do not affect the precision of the gpcBR index determination. In other particular cases, other methods for determining $M_w$ moments may be preferable to the aforementioned technique.

Nuclear Magnetic Resonance ($^{13}$C NMR)

Samples involving LDPE and the inventive examples are prepared by adding approximately 3 g of a 50/50 mixture of tetrachloroethane-$d_2$/orthodichlorobenzene containing 0.025 M Cr(AcAc)$_3$ to a 0.25 g polymer sample in a 10 mm NMR tube. Oxygen is removed from the sample by placing the open tubes in a nitrogen environment for at least 45 minutes. The samples are then dissolved and homogenized by heating the tube and its contents to 150° C. using a heating block and heat gun. Each dissolved sample is visually inspected to ensure homogeneity. Samples are thoroughly mixed immediately prior to analysis and were not allowed to cool before insertion into the heated NMR sample holders.

The ethylene-based polymer samples are prepared by adding approximately 3 g of a 50/50 mixture of tetrachloroethane-$d_2$/orthodichlorobenzene containing 0.025 M Cr(AcAc)$_3$ to 0.4 g polymer sample in a 10 mm NMR tube. Oxygen is removed from the sample by placing the open tubes in a nitrogen environment for at least 45 minutes. The samples are then dissolved and homogenized by heating the tube and its contents to 150° C. using a heating block and heat gun. Each dissolved sample is visually inspected to ensure homogeneity. Samples are thoroughly mixed immediately prior to analysis and are not allowed to cool before insertion into the heated NMR sample holders.

All data are collected using a Bruker 400 MHz spectrometer. The data is acquired using a 6 second pulse repetition delay, 90-degree flip angles, and inverse gated decoupling with a sample temperature of 125° C. All measurements are made on non-spinning samples in locked mode. Samples are allowed to thermally equilibrate for 15 minutes prior to data acquisition. The $^{13}$C NMR chemical shifts were internally referenced to the EEE triad at 30.0 ppm.

C13 NMR Comonomer Content

It is well known to use NMR spectroscopic methods for determining polymer composition. ASTM D 5017-96, J. C. Randall et al., in "NMR and Macromolecules" ACS Symposium series 247, J. C. Randall, Ed., Am. Chem. Soc., Washington, D.C., 1984, Ch. 9, and J. C. Randall in "Polymer Sequence Determination", Academic Press, New York (1977) provide general methods of polymer analysis by NMR spectroscopy.

Cross-Fractionation by TREF (xTREF)

The cross-fractionation by TREF (xTREF) provides a separation by both molecular weight and crystallinity using ATREF and GPC. Nakano and Goto, *J. Appl. Polym. Sci.*, 24, 4217-31 (1981), described the first development of an automatic cross fractionation instrument. The typical xTREF process involves the slow crystallization of a polymer sample onto an ATREF column (composed of glass beads and steel shot). After the ATREF step of crystallization the polymer is sequentially eluted in predetermined temperature ranges from the ATREF column and the separated polymer fractions are measured by GPC. The combination of the elution temperature profile and the individual GPC profiles allow for a 3-dimensional representation of a more complete polymer structure (weight distribution of polymer as function of molecular weight and crystallinity). Since the elution temperature is a good indicator for the presence of short chain branching, the method provides a fairly complete structural description of the polymer.

Figure 12:
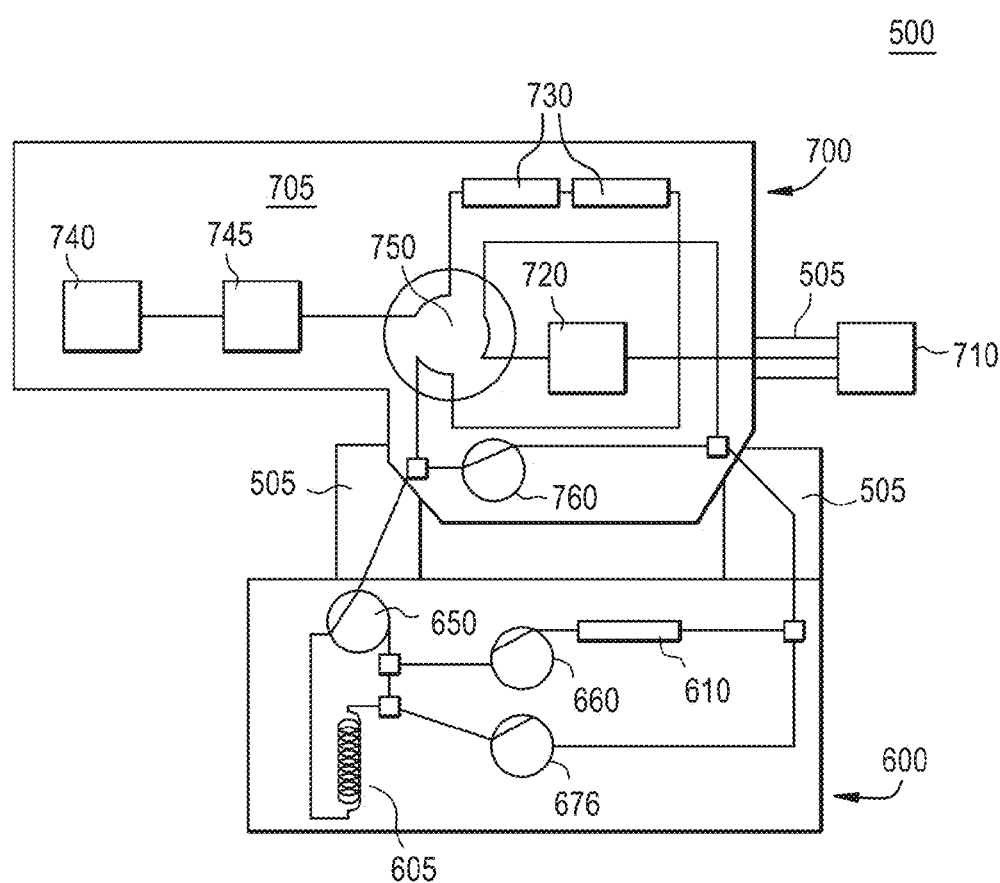
FIG. 12 represents a schematic of a cross-fractionation instrument for performing Cross-Fractionation by TREF analysis.

A detailed description of the design and operation of the cross-fractionation instrument can be found in PCT Publication No. WO 2006/081116 (Gillespie, et al.). FIG. 12 shows a schematic for the xTREF instrument 500. This instrument has a combination of at least one ATREF oven 600 and a GPC 700. In this method, a Waters GPC 150 is used. The xTREF instrument 500, through a series of valve movements, operates by (1) injecting solutions into a sample loop and then to the ATREF column, (2) crystallizing the polymer by cooling the ATREF oven/column, and (3) eluting the fractions in step-wise temperature increments into the GPC. Heated transfer lines 505, kept at approximately 150° C., are used for effluent flow between various components of the xTREF instrument 500. Five independent valve systems (GPC 700 2-way/6-port valve 750 and 2-way/3-port valve 760; ATREF oven 600 valves 650, 660, and 670) control the flow path of the sample.

The refractive index (RI) GPC detector 720 is quite sensitive to solvent flow and temperature. Fluctuations in the solvent pressure during crystallization and elution can lead to elution artifacts during the TREF elution. An external infrared (IR) detector 710, the IR4, supplied by Polymer ChAR (Valencia, Spain) is added as the primary concentration detector (RI detector 720) to alleviate this concern. Other detectors (not shown) are the LALLS and viscometer configured as described in the Gel Permeation Chromatography method, provided infra in the Testing Methods section. In FIG. 12, a 2-way/6-port valve 750 and a 2-way/3-port valve 760 (Valco; Houston, Tex.) are placed in the Waters 150 C heated column compartment 705.

Each ATREF oven 600 (Gaumer Corporation, Houston, Tex.) uses a forced flow gas (nitrogen) design and are well insulated. Each ATREF column 610 is constructed of 316 SS 0.125" OD by 0.105" (3.18 millimeter) ID precision bore tubing. The tubing is cut to 19.5" (495.3 millimeters) length and filled with a 60/40 (v/v) mix of stainless steel 0.028" (0.7 millimeter) diameter cut wire shot and 30-40 mesh spherical technical quality glass. The stainless steel cut wire shot is from Pellets, Inc. (North Tonawanda, N.Y.). The glass spheres are from Potters Industries (Brownwood, Tex.). The interstitial volume was approximately 1.00 ml. Parker fitted low internal volume column end fittings (Part number 2-1 Z2HCZ-4-SS) are placed on each tube end and the tubing is wrapped into a 1.5" (38.1 millimeters) coil. Since TCB has a very high heat capacity at a standard flowrate of 1.0 ml/minute, the ATREF column 610 (which has an interstitial volume of around 1 ml) may be heated or quenched without the pre-equilibration coil 605. It should be noted that the pre-equilibration coil 605 has a large volume (>12 milliliters) and, therefore, is only inline during the ATREF elution cycle (and not the ATREF loading cycle). The nitrogen to the ATREF oven 600 passed through a thermostatically controlled chiller (Airdyne; Houston, Tex.) with a 100 psig nitrogen supply capable of discharging 100 scf/minute of 5 to 8° C. nitrogen. The chilled nitrogen is piped to each analytical oven for improved low temperature control purposes.

The polyethylene samples are prepared in 2-4 mg/ml TCB depending upon the distribution, density, and the desired number of fractions to be collected. The samples preparation is similar to that of conventional GPC.

The system flow rate is controlled at 1 ml/minute for both the GPC elution and the ATREF elution using the GPC pump 740 and GPC sample injector 745. The GPC separation is accomplished through four 10 μm "Mixed B" linear mixed bed GPC columns 730 supplied by Polymer Laboratories (UK). The GPC heated column compartment 705 is operated at 145° C. to prevent precipitation when eluting from the ATREF column 610. Sample injection amount is 500 μl. The ATREF oven 600 conditions are: temperature is from about 30 to about 110° C.; crystallization rate of about 0.123° C./minute during a 10.75 hour period; an elution rate of 0.123° C./minute during a 10.75 hour period; and 14 P-TREF fractions.

The GPC 700 is calibrated in the same way as for conventional GPC except that there is "dead volume" contained in the cross-fractionation system due to the ATREF column 610. Providing a constant volume offset to the collected GPC data from a given ATREF column 610 is easily implemented using the fixed time interval that is used while the ATREF column 620 is being loaded from the GPC sample injector 745 and converting that (through the flow rate) to an elution volume equivalent. The offset is necessary because during the operation of the instrument, the GPC start time is determined by the valve at the exit end of the ATREF column and not the GPC injector system. The presence of the ATREF column 610 also causes some small reduction in apparent GPC column 730 efficiency. Careful construction of the ATREF columns 610 will minimize its effect on GPC column 730 performance.

During a typical analysis, 14 individual ATREF fractions are measured by GPC. Each ATREF fraction represents approximately a 5-7° C.-temperature "slice". The molecular weight distribution (MWD) of each slice is calculated from the integrated GPC chromatograms. A plot of the GPC MWDs as a function of temperature (resulting in a 3D surface plot) depicts the overall molecular weight and crystallinity distribution. In order to create a smoother 3D surface, the 14 fractions are interpolated to expand the surface plot to include 40 individual GPC chromatograms as part of the calculation process. The area of the individual GPC chromatograms correspond to the amount eluted from the ATREF fraction (across the 5-7° C.-temperature slice). The individual heights of GPC chromatograms (Z-axis on the 3D plot) correspond to the polymer weight fraction thus giving a representation of the proportion of polymer present at that level of molecular weight and crystallinity.

EXAMPLES

Preparation of Ethylene-Based Polymers

A continuous solution polymerization is carried out in a computer-controlled well mixed reactor to form three ethylene-based polyethylene polymers. The solvent is a purified mixed alkanes solvent called ISOPAR E (ExxonMobil Chemical Co., Houston, Tex.). A feed of ethylene, hydrogen, and polymerization catalyst are fed into a 39 gallon (0.15 cubic meters) reactor. See Table 2 for the amounts of feed and reactor conditions for the formation of each of the three ethylene-based polyethylene polymers, designated Polymer (P) 1-3. "SCCM" in Table 2 is standard cubic centimeters per minute gas flow. The catalyst for all three of the ethylene-based polyethylene polymers is a titanium-based constrained geometry catalyst (CGC) with the composition Titanium, [N-(1,1-dimethylethyl)-1,1-dimethyl-1[(1,2,3,3a,7a-η)-3-(1-pyrrolidinyl)-1H-inden-1-yl]silanaminato(2-)-κN][(1,2,3,4-η)-1,3-pentadiene]. The cocatalyst is a modified methylalumoxane (MMAO). The CGC activator is a blend of amines, bis(hydrogenated tallow alkyl)methyl, and tetrakis (pentafluorophenyl)borate(1-). The reactor is run liquid-full at approximately 525 psig.

The process of polymerization is similar to the procedure detailed in Examples 1-4 and FIG. 1 of U.S. Pat. No. 5,272, 236 (Lai, et al.) and Example 1 of U.S. Pat. No. 5,278,272 (Lai, et al.), except that a comonomer is not used in forming P 1-3. Because no comonomer is used, P 1-3 are ethylene homopolymers. Conversion is measured as percent ethylene conversion in the reactor. Efficiency is measured as the weight of the polymer in kilograms produced by grams of titanium in the catalyst.

After emptying the reactor, additives (1300 ppm IRGAFOS 168, 200 ppm IRGANOX 1010, 250 ppm IRGANOX 1076, 1250 ppm calcium stearate) are injected into each of the three ethylene-based polyethylene polymer post-reactor solutions. Each post-reactor solution is then heated in preparation for a two-stage devolatization. The solvent and unreacted monomers are removed from the post-reactor solution during the devolatization process. The resultant polymer melt is pumped to a die for underwater pellet cutting.

Selected properties for P1-3 are provided in Table 3. P1-3 are presented with density, melt index ($I_2$), $I_{10}$, and Brookfield viscosity determined using the Density, Melt Index, and Brookfield Viscosity methods, all described infra. "NM" means not measured.

TABLE 2

Feed amounts and reactor conditions for creating ethyene-based polymers P1-3.

| Polymer Samples | $C_2H_4$ Feed (kg/hr) | Solvent Feed (kg/hr) | $H_2$ (sccm) | T (° C.) | Catalyst (ppm) | Catalyst Flow (kg/hr) | Activator Conc. (ppm) | Activator Flow (kg/hr) | Cocatalyst Conc. (ppm) | Cocatalyst Flow (kg/hr) | Polymerization Rate (kg/hr) | Conversion (%) | Solids % | Efficiency |
|---|---|---|---|---|---|---|---|---|---|---|---|---|---|---|
| P1 | 178 | 1,261 | 19,067 | 160 | 84 | 0.5897 | 3,462 | 0.5012 | 311 | 0.7160 | 160 | 85.3 | 11.1 | 3,239 |
| P2 | 144 | 1,021 | 25,581 | 157 | 441 | 0.6020 | 5,572 | 1.783 | 699 | 0.8553 | 139 | 90.4 | 11.9 | 522 |
| P3 | 177 | 1,260 | 8,998 | 150 | 84 | 0.3777 | 3,462 | 0.3187 | 291 | 0.4917 | 157 | 84.1 | 10.9 | 4,956 |

TABLE 3

Selected properties for ethylene-based polymers P1-3.

| Polymer Samples | Density (g/cm³) | $I_2$ | $I_{10}$ | $I_{10}/I_2$ | Brookfield Viscosity (cP) 177° C. |
|---|---|---|---|---|---|
| P1 | 0.965 | 62 | 387 | 6.2 | NM |
| P2 | 0.967 | NM | NM | NM | 10,818 |
| P3 | 0.958 | 4.9 | 29 | 5.8 | NM |

Preparation of Example Ethylenic Polymers 1 and 2

Example 1

Two grams of Polymer 2 (P2) are added to a 100 ml autoclave reactor. After closing the reactor, the agitator is turned on at 1000 rpm (revolutions per minute). The reactor is deoxygenated by pulling vacuum on the system and pressurizing with nitrogen. This is repeated three times. The reactor is then pressurized with ethylene up to 2000 bar while at ambient temperatures and then vented off. This is repeated three times. On the final ethylene vent of the reactor, the pressure is dropped only to a pressure of about 100 bar, where the reactor heating cycle is initiated. Upon achieving an internal temperature of ~220° C., the reactor is then pressurized with ethylene to about 1600 bar and held at 220° C. for at least 30 minutes. The estimated amount of ethylene in the reactor is approximately 46.96 grams. Ethylene is then used to sweep 3.0 ml of a mixture of 0.5648 mmol/ml propionaldehyde and 0.01116 mmol/ml tert-butyl peroxyacetate initiator in n-heptane into the reactor. An increase in pressure (to ~2000 bar) in conjunction with the addition of initiator causes the ethylene monomer to free-radical polymerize. The polymerization leads to a temperature increase to 274° C. After allowing the reactor to continue to mix for 15 minutes, the reactor is depressurized, purged, and opened. A total of 4.9 grams of resultant ethylenic polymer, designated Example 1, is physically recovered from the reactor (some additional product polymer is unrecoverable due to the reactor bottom exit plugging). Based upon the conversion value of ethylene in the reactor, the ethylenic polymer of Example 1 comprises up to 40 weight percent ethylene-based polyethylene P2 and the balance is highly long chain branched ethylene-based polymer generated by free-radical polymerization.

Comparative Example 1

Free-radical polymerization of ethylene under the same process conditions as Example 1 without the addition of an ethylene-based polymer yields 4.9 grams of a highly long chain branched ethylene-based polymer designated as Comparative Example 1 (CE1). A temperature increase to 285° C. occurs during the reaction.

Example 2

Two grams of Polymer 1 (P1) are added to a 100 ml autoclave reactor. After closing the reactor, the agitator is turned on at 1000 rpm. The reactor is deoxygenated by pulling vacuum on the system and pressurizing with nitrogen. This is repeated three times. The reactor is then pressurized with ethylene up to 2000 bar while at ambient temperatures and then vented off. This is repeated three times. On the final ethylene vent of the reactor, the pressure is dropped only to a pressure of about 100 bar, where the reactor heating cycle is initiated. Upon achieving an internal temperature of ~220° C., the reactor is then pressurized with ethylene to about 1600 bar and held at 220° C. for at least 30 minutes. At this point the estimated amount of ethylene in the reactor is approximately 46.96 grams. Ethylene is then used to sweep 3.0 ml of a mixture of 0.5648 mmol/ml propionaldehyde and 0.01116 mmol/ml tert-butyl peroxyacetate initiator in n-heptane into the reactor. The increase in pressure (to ~2000 bar) in conjunction with the addition of initiator causes the ethylene to free-radical polymerize. The polymerization leads to a temperature increase to 267° C. After allowing the reactor to continue to mix for 15 minutes, the reactor is depressurized, purged, and opened. A total of 7.4 grams of resultant ethylenic polymer, designated Example 2, is physically recovered from the reactor (some additional product polymer is unrecoverable due to the reactor bottom exit plugging). Based upon the conversion value of ethylene in the reactor, ethylenic polymer of Example 2 comprises approximately 27 weight percent ethylene-based polyethylene P1 and the balance is highly long chain branched ethylene-based polymer generated by free-radical polymerization.

Characterization of Example Ethylenic Polymers 1 and 2

Both ethylenic polymers Examples 1 and 2, highly long chain branched ethylene-based polymer Comparative Example 1, and both ethylene-based polymers P1 and P2 are tested using the DSC Crystallinity method, provided infra in the Testing Methods section. The calculated density for the Comparative Example polymer are from the use of the Density method, provided infra in the Testing Methods section. Results of the testing are provided in Table 4 and FIGS. 3 and 4.

TABLE 4

Results of DSC Crystallinity testing for Examples 1 and 2, Comparative Example 1, and P1 and P2.

| Sample ID | Heat of fusion (J/g) | % Crystallinity | High Melting Point Peak $T_m$ (° C.) | Low Melting Point Peak $T_m$ (° C.) | Peak $T_c$ (° C.) | Calculated Density (g/cm³) | Density (g/cm³) |
|---|---|---|---|---|---|---|---|
| Example 1 | 156.3 | 53.5 | 116.6 | 111.5 | 106.0 | 0.937** | NM |
| P2 | 231.7 | 79.3 | 130.0 | NM | 117.7 | NM | 0.967 |
| Example 2 | 161.1 | 55.2 | 121.0 | NM | 109.1 | 0.930** | NM |
| P1 | 233.4 | 79.9 | 133.5 | NM | 116.6 | NM | 0.965 |
| CE1 | 142.9 | 48.9 | 110.2 | NM | 96.6 | 0.918* | NM |

Note that "NM" designates not measured. Density is taken from the results of Table 3 for P1 and P2.
*Calculated using equation 1.
**Calculated using $(1/\rho) = ((w_1/\rho_1) + (w_2/\rho_2))$ where $\rho$ = density of the example (g/cm³) and $w_1$ = weight fraction of CE1 described in Preparation of Example Ethylenic Polymers 1 and 2 for that example and $\rho_1$ = calculated density for CE1 from equation 1 and $w_2$ = weight fraction described in Preparation of Example Ethylenic Polymers 1 and 2 of either P1 or P2 used for that example and $\rho_2$ = measured density for either P1 or P2 used for that example.

Both ethylenic polymer Examples 1 and 2 have peak melting temperature values between that of Comparative Example 1, which is highly long chain branched ethylene-based polymer made under the same base conditions as Examples 1 and 2, and each of their respective ethylene-based polyethylene Polymers 2 and 1. Table 4 shows the highest peak melting temperatures, $T_m$, of the Examples are higher by about 7 to 11° C. and have a greater amount of crystallinity, about 5 to 6 percent, versus Comparative Example 1. Additionally, the peak crystallization temperatures, $T_c$, are about 9 to 12° C. higher than Comparative Example 1, indicating additional benefits in terms of the ability to cool or solidify at a higher temperature than CE1. The DSC Crystallinity results indicate that the ethylenic polymer Examples 1 and 2 have both higher peak melting temperatures and peak crystallization temperatures as well as different heats of fusion values than the comparative example highly long chain branched ethylene-based polymer (Comparative Example 1). Additionally, Examples 1 and 2 also differ in some properties from P2 and P1, especially the heat of fusion value. This strongly indicates that Examples 1 and 2 are different from their respective highly long chain branched ethylene-based polymer and ethylene-based polymer components.

Figure 3:
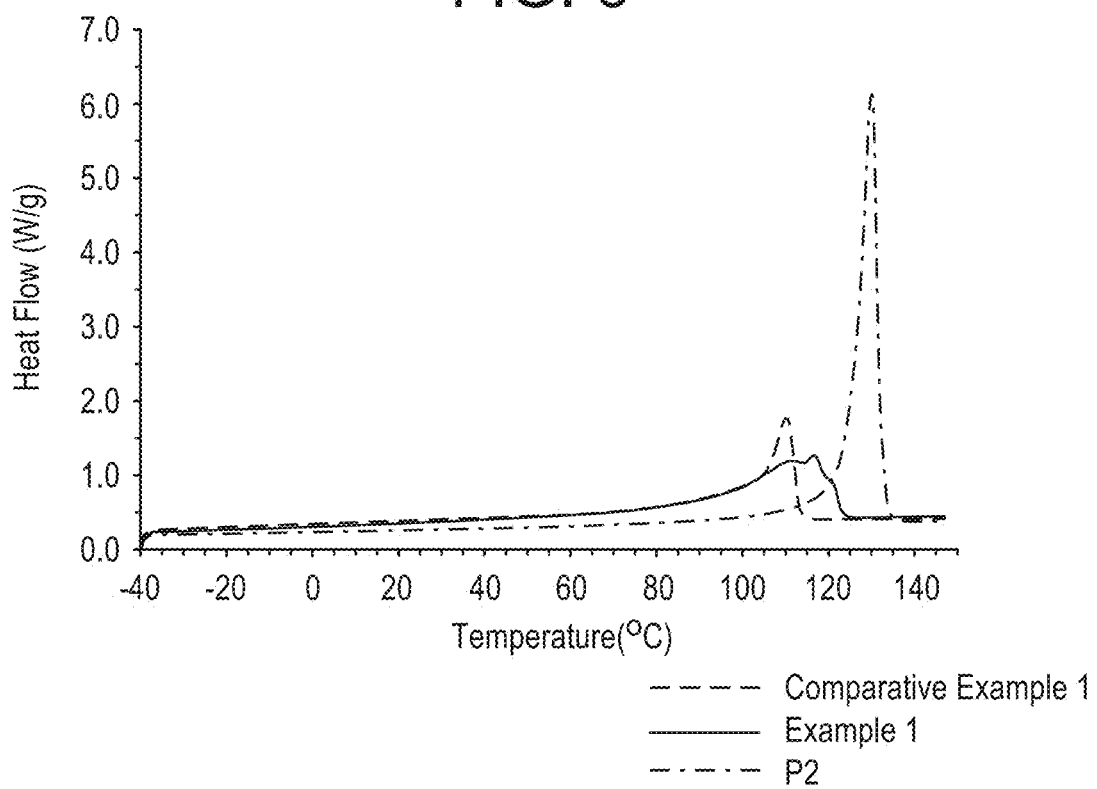
FIG. 3 is a plot of heat flow versus temperature as determined by DSC Crystallinity analysis for Example 1, Comparative Example 1 (CE 1), and Polymer 2 (P 2).
Figure 4:
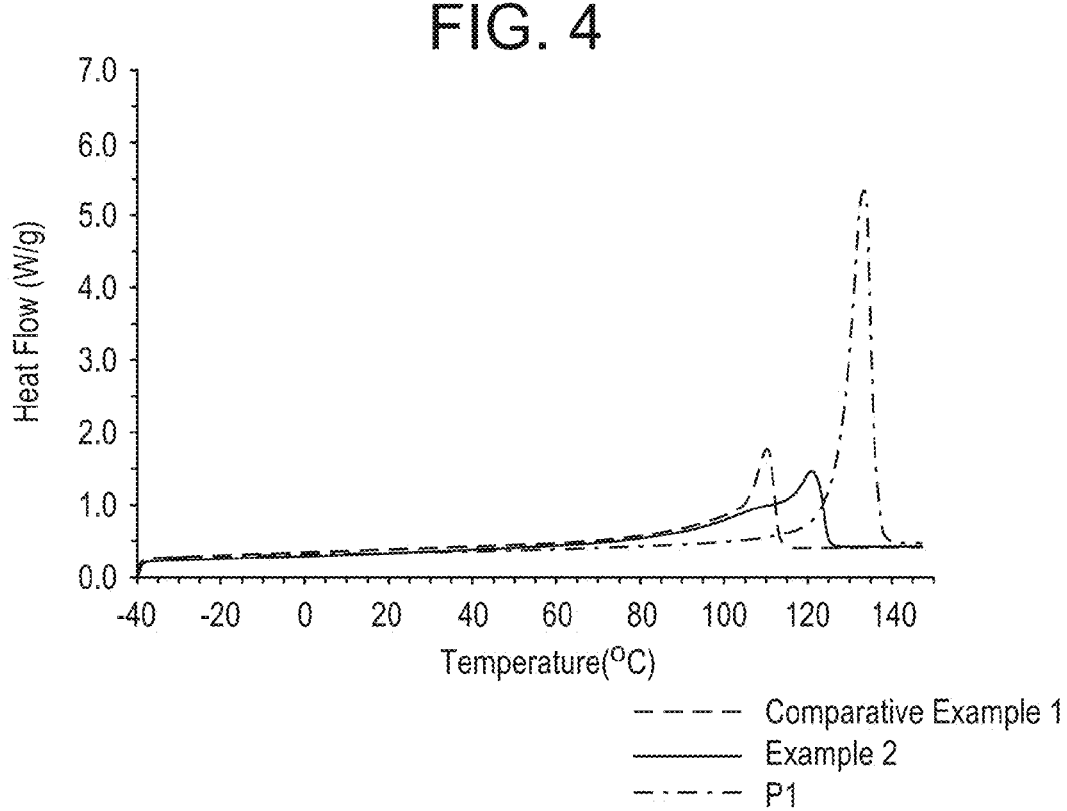
FIG. 4 is a plot of heat flow versus temperature as determined by DSC Crystallinity analysis of Example 2, Comparative Example 1 (CE 1), and Polymer 1 (P 1).

FIGS. 3 and 4 show the heat flow versus temperature plots for the ethylenic polymer Examples. Also shown in these figures are the heat flow versus temperature plots for the respective ethylene-based polyethylene P2 and P1 and Comparative Example 1.

Figure 5:
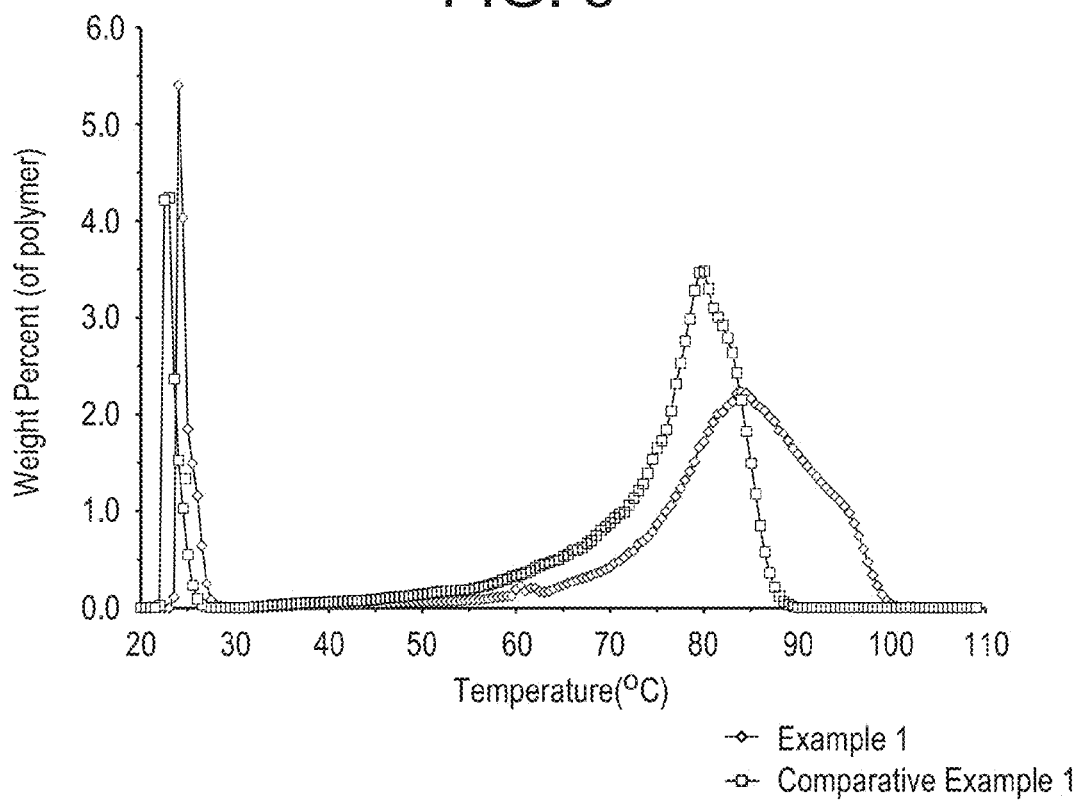
FIG. 5 is a plot of temperature versus weight percent of polymer sample eluted as determined by Analytical Temperature Rising Elution Fractionation analysis of Example 1 and Comparative Example 1.
Figure 6:
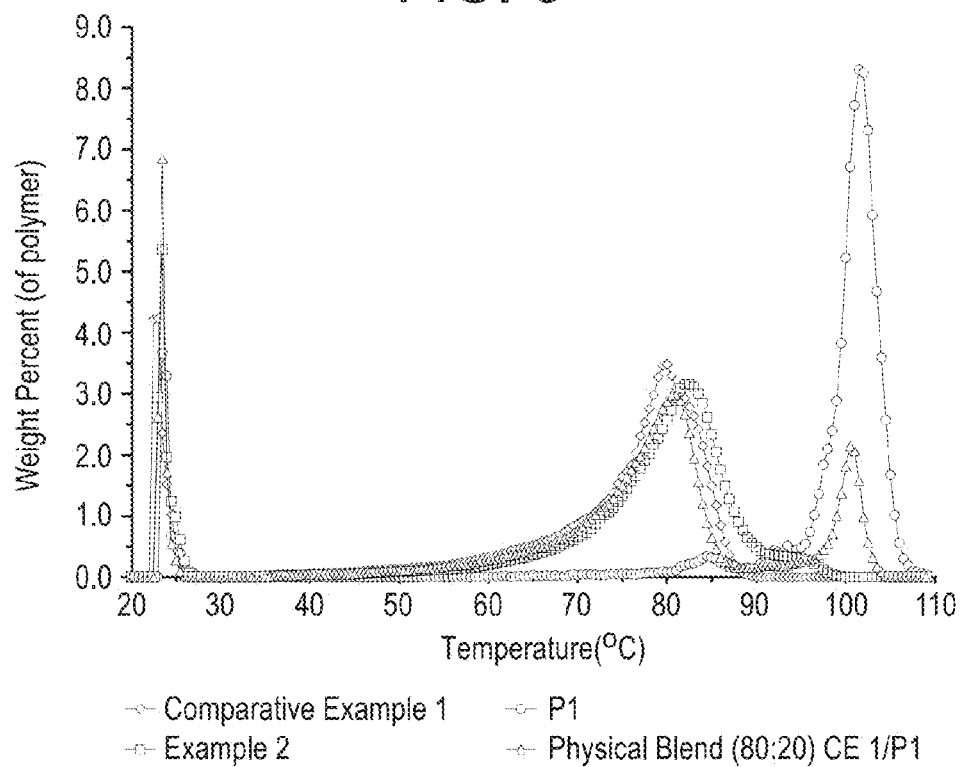
FIG. 6 is a plot of temperature versus weight percent of polymer sample eluted as determined by Analytical Temperature Rising Elution Fractionation analysis of Example 2, Comparative Example 1, and Polymer 1.

Examples 1 and 2, Comparative Example 1, Polymer 1, and an 80:20 weight ratio physical blend of CE1 and P1 are tested using the Analytical Temperature Rising Elution Fractionation method, provided infra in the Testing Methods section. In FIG. 5, the ATREF runs for Example 1 and Comparative Example 1 are plotted. In FIG. 6, the ATREF runs for Example 2, Polymer 1, Comparative Example 1, and an 80:20 weight ratio physical blend of CE1 and P1 are plotted. Table 5 gives the percentage of total weight fraction of each polymer sample eluting above 90° C.

TABLE 5

Weight percentage of total polymer eluting above 90° C. per ATREF analysis.

| Sample ID | % Weight Fraction Above 90° C. |
|---|---|
| Example 1 | 19.0 |
| Comparative Example 1 | 0.0 |
| Example 2 | 5.3 |
| Physical Blend 80:20 CE 1:P1 | 17.9 |
| P1 | 85.2 |

The higher crystallinity of Example 1 relative to Comparative Example 1 is shown by the ATREF plot given in FIG. 5. As shown in FIG. 5, Example 1 has higher temperature melting fractions than Comparative Example 1, the highly branched ethylene-based polymer. More importantly, the ATREF distribution curve of Example 1 shows a relatively homogeneous curve, indicating a generally monomodal crystallinity distribution. If ethylenic polymer Example 1 is merely a blend of separate components, it could be expected to show a bimodal curve of two blended polymer components. Table 5 also shows that Example 1 has a portion of the polymer which would elute at temperatures at or above 90° C. Comparative Example 1 does not have a portion that elutes at or above 90° C.

The plot of FIG. 6 shows the ATREF plots of Example 2, Polymer 1, and Comparative Example 1. In comparing the three plots, it is apparent that Example 2 is different than both the highly long chain branched ethylene-based polymer (CE1) and the ethylene-based polymer (P1), and not a mere blend. Comparative Example 1 has no elution above 90° C. P1 has a significant amount of material eluting in the 90° C. or above temperature fraction (85.2%), indicating a predominance of the high crystallinity ethylene-based polymer fraction. Example 2, similar to Example 1, shows a relatively homogeneous curve, indicating a relatively narrow crystallinity distribution.

Additionally, a physical blend of an 80:20 weight ratio CE1:P1 composition is compared against ethylenic polymer Example 2 in FIG. 6. The 80:20 weight ratio physical blend is created to compare to the estimated 27 weight percent ethylene-based polymer P1 and balance highly long chain branched ethylene-based polymer composition that comprises Example 2, as stated previously in the Preparation of Example Ethylenic Polymers 1 and 2 section. The ATREF distribution in FIG. 6 shows the 80:20 weight ratio blend has a well resolved bimodal distribution since it is made as a blend of two distinct polymers. As previously observed, ethylenic polymer Example 2 does not have a bimodal distribution. Additionally, as shown in Table 5, ethylenic polymer Example 2 has a small amount of material eluting in the 90° C. or above temperature fraction (5.3%), whereas the 80:20 weight ratio physical blend has an amount of elution (17.9%) reflective of its high crystallinity ethylene-based polymer fraction.

Triple detector GPC (3D-GPC) using the Gel Permeation Chromatography (GPC) method, provided infra in the Testing Methods section, results are summarized in Table 6.

TABLE 6

Triple detector GPC results, g', and gpcBR analysis results for Examples 1 and 2, Comparative Example 1, and a 1 MI metallocene polyethylene standard.

| | Conventional GPC | | | | Absolute GPC | | | | | | | |
|---|---|---|---|---|---|---|---|---|---|---|---|---|
| Identification | Mn (g/mol) | Mw (g/mol) | Mz (g/mol) | Mw/Mn | Mw (g/mol) | Mz(abs) (g/mol) | Mz/Mw | Mw (Abs) Mw(GPC) | gpcBR Whole | g' avg | MH | LCBf |
| Example 1 | 11,950 | 51,570 | 185,200 | 4.32 | 65,180 | 383,800 | 5.89 | 1.26 | 0.53 | 0.765 | 0.534 | 0.853 |
| Comparative Example 1 | 15,480 | 77,920 | 290,400 | 5.03 | 117,660 | 854,600 | 7.26 | 1.51 | 0.89 | 0.716 | 0.464 | 0.973 |
| Example 2 | 16,140 | 74,760 | 198,100 | 4.63 | 96,660 | 327,400 | 3.39 | 1.29 | 0.64 | 0.725 | 0.532 | 0.780 |
| Standard PE (1 MI Metallacene) | 41,350 | 115,630 | 241,100 | 2.80 | 114,430 | 268,500 | 2.35 | 0.99 | 0.01 | 1.000 | 0.701 | 0.000 |

From Table 6 it can be seen that both Examples 1 and 2 show a narrower molecular weight distribution, $M_w/M_n$ ratio, by conventional GPC than that of the highly long chain branched ethylene-based polymer Comparative Example 1 (5.03 for the control; 4.32 for Example 1; and 4.63 for Example 2). The narrower $M_w/M_n$ ratio of both Examples can provide benefits in physical properties, improved clarity, and reduced haze over the Comparative Example 1 for film applications. The $M_z/M_w$ ratio from absolute GPC also distinguishes the ethylenic polymer Examples with narrower values (5.89 and 3.39) and Comparative Example 1 (7.26). The lower $M_z/M_w$ ratio is associated with improved clarity when used in films. The $M_w(abs)/M_w(GPC)$ ratio shows that the Examples have lower values (1.26, 1.29) than the Comparative Example 1 (1.51).

In Table 6, branching analysis using both g' and gpcBR are also included. The g' value is determined by using the g' by 3D-GPC method, provided infra in the Testing Methods section. The gpcBR value is determined by using the gpcBR Branching Index by 3D-GPC method, provided infra in the Testing Methods section. The lower gpcBR values for the two ethylenic Examples as compared to Comparative Example 1 and Example 2 indicate comparatively less long chain branching; however, compared to a 1 MI metallocene polymer, there is significant long chain branching in all the compositions.

Preparation of Example Ethylenic Polymers 3-5

Examples 3-5

This procedure is repeated for each Example. For each example, 2 grams of resin of one of the ethylene-based polymers created in the Preparation of Ethylene-Based Polymers (that is, P1-3) are added to a 100 ml autoclave reactor. Example 3 is comprised of P2. Example 4 is comprised of P1. Example 5 is comprised of P3. The base properties of these polymers may be seen in Table 3. After closing the reactor, the agitator is turned on at 1000 rpm. The reactor is deoxygenated by pulling vacuum on the system, heating the reactor to 70° C. for one hour, and then flushing the system with nitrogen. After this, the reactor is pressurized with nitrogen and vacuum is pulled on the reactor. This step is repeated three times. The reactor is pressurized with ethylene up to 2000 bar while at ambient temperatures and vented off. This step is repeated three times. On the final ethylene vent, the pressure is dropped only to a pressure of about 100 bar and reactor heating is initiated. When the internal temperature reaches about 220° C., the reactor is then pressurized with ethylene to about 1600 bar and held at 220° C. for at least 30 minutes. The estimated amount of ethylene in the reactor is 46.53 grams. Ethylene is then used to sweep 3.9 ml of a mixture of 0.4321 mmol/ml propionaldehyde and 0.0008645 mmol/ml tert-butyl peroxyacetate initiator in n-heptane into the reactor. Upon sweeping the initiator into the reactor, the pressure is increased within the reactor to about 2000 bar, where free-radical polymerization is initiated. A temperature rise of the reactor to 240° C. is noted. After mixing for 15 minutes, the valve at the bottom of the reactor is opened and the pressure is lowered to between 50-100 bar to begin recovering the resultant polymer. Then the reactor is repressurized to 1600 bar, stirred for 3 minutes, and then the valve at the bottom is opened to again lower the pressure to between 50-100 bar. For each Example, a total of about 6 grams of product polymer is recovered from the reactor. Based upon the conversion value of ethylene in the reactor, each Example is comprised of about 33% weight percent ethylene-based polymer and about 67% weight percent highly long chain branched ethylene-based polymer formed during the free radical polymerization.

Comparative Example 2

Free-radical polymerization of ethylene under the same process conditions as given in Examples 3-5 without the addition of any ethylene-based polymer yields 4.64 grams of a highly long chain branched ethylene-based polymer designated as Comparative Example (CE) 2. Because no comonomer is used, Comparative Example 2 is an ethylene homopolymer. A temperature increase during the free radical reaction to 275° C. is noted.

Characterization of Example Ethylenic Polymers 3-5

Ethylenic polymer Examples 3-5 are tested using both the DSC Crystallinity and Fast Temperature Rising Elution Fractionation methods, provided infra in the Testing Methods section. The results of the testing of Examples 3-5 are compared to similar test results of Comparative Example 2, Polymers 1-3, and physical blends of Comparative Example 2 with Polymers 1-3. The results are shown in Table 7.

TABLE 7

DSC analysis of Example 3-5, Polymers 1-3, Comparative Example 2, and individual physical blends of P1-3 and CE2.

| Sample | Low Melting Point Peak $T_m$, (° C.) | High Melting Point Peak $T_m$, (° C.) | Heat of Fusion (J/g) | Calculated Density (g/cm³) | Density (g/cm³) |
|---|---|---|---|---|---|
| Comparative Example 2 | NM | 110.7 | 148.7 | 0.921* | NM |
| P2 | NM | 130.0 | 239.5 | NM | 0.967 |
| Example 3 | 113.6 | 124.7 | 166.2 | 0.936** | NM |
| Blend 67:33 CE2:P2 | 109.5 | 127.0 | 178.1 | NM | NM |
| P1 | NM | 132.4 | 230.3 | NM | 0.965 |
| Example 4 | 110.2 | 124.9 | 163.7 | 0.935** | NM |
| Blend 67:33 CE2:P1 | 109.5 | 128.9 | 173.9 | NM | NM |
| P3 | NM | 134.1 | 209.9 | NM | 0.958 |
| Example 5 | 111.4 | 123.8 | 158.5 | 0.933** | NM |
| Blend 67:33 CE2:P3 | 109.0 | 129.4 | 170.9 | NM | NM |

Note that "NM" designates not measured. Density values are taken from Table 3 for P1, P2, P3. Calculated Density for comparative example 2 is determined using Equation 1.
*Calculated using equation 1.
**Calculated using $(1/\rho) = ((w_1/\rho_1) + (w_2/\rho_2))$ where $\rho$ = density of the example (g/cm³) and $w_1$ = weight fraction of CE2 described in Preparation of Example Ethylenic Polymers 3-5 for that example and $\rho_1$ = calculated density for CE2 from equation 1 and $w_2$ = weight fraction described in Preparation of Example Ethylenic Polymers 3-5 of either P1 or P2 or P3 used for that example and $\rho_2$ = measured density for either P1 or P2 or P3 used for that example.

Figure 7:
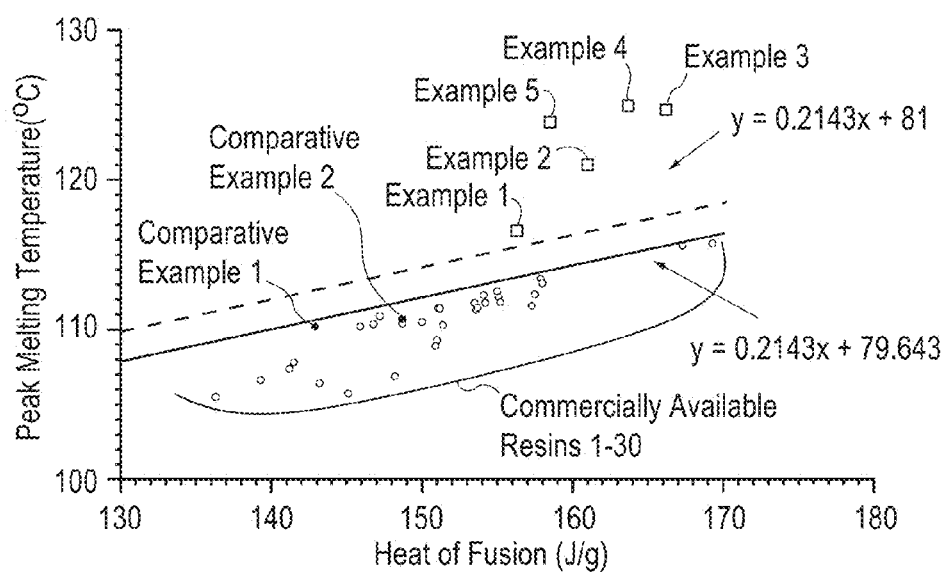
FIG. 7 is a plot of maximum peak melting temperature versus heat of fusion for Examples 1-5, Comparative Examples 1 and 2, and Commercially Available Resins 1-30, and a linear demarcation between the Examples, the Comparative Examples, and the Commercially Available Resins.

Using data from Tables 3, 4, and 7, a comparison plot between peak melting temperature ($T_m$) and heat of fusion ($H_f$) comparing Examples 1-5, Comparative Examples 1 and 2, and Commercial Available Resins 1-30 can be made to find relative relationships, such as the relationship shown in FIG. 7. Note in the case of materials with multiple melting temperatures, the peak melting temperature is defined as the highest melting temperature. FIG. 7 reveals that all five of the Examples demonstrate different functional properties from the group created by the Comparative Examples and the Commercially Available Resins.

Due to the separation between the five ethylenic polymer Examples and the group formed from the two Comparative Examples and the Commercially Available Resins, a line of demarcation between the groups to emphasize the difference may be established for a given range of heats of fusion. As shown in FIG. 7, a numerical relationship, Equations 15, may be used to represent such a line of demarcation:

$$T_m(°C.)=(0.2143*H_f(J/g))+79.643 \quad \text{(Eq. 15)}.$$

For such a relationship line, and as can be seen in FIG. 7, all five ethylenic polymer Examples have at least a high melting point peak $T_m$ equal to, if not greater than, a determined peak melting temperature using Equation 15 for a given heat of fusion value. In contrast, all of the Comparative Examples and Commercially Available Resins are below the relationship line, indicating their peak melting temperatures are less than a determined peak melting temperatures using Equation 15 for a given heat of fusion value.

Also shown in FIG. 7, numerical relationships, Equations 16 and 17, may also be used to represent such a line of demarcation based upon the relationships between the Examples, Comparative Examples, and Commercially Available Resins as just discussed:

$$T_m(°C.)=(0.2143*H_f(J/g))+81 \quad \text{(Eq. 16)},$$

$$\text{More preferably } T_m(°C.)=(0.2143*H_f(J/g))+85 \quad \text{(Eq. 17)}.$$

Tables 4 and 7 reveal a heat of fusion range for the Example ethylenic polymers. The heat of fusion of the ethylenic polymers are from about 120 to about 292 J/g, preferably from about 130 to about 170 J/g.

Tables 4 and 7 also show a peak melting temperature range for the Example ethylenic polymers. The peak melting temperature of the ethylenic polymers are equal to or greater than about 100° C., and preferably from about 100 to about 130° C.

Ethylenic polymer Examples 3-5, Comparative Example 2, and Polymers 1-3 are tested using the Nuclear Magnetic Resonance method, provided infra in the Testing Methods section, to show comparative instances of short chain branching. The results are shown in Table 8.

TABLE 8

Nuclear Magnetic Resonance analysis for short chain branching distribution in samples of Comparative Example 2 and ethylenic polymers Examples 3-5.

| Sample | C1 | C2 | C3 | C4 | C5 | C6+ |
|---|---|---|---|---|---|---|
| Comparative Ex. 2 | 0.85 | 1.04 | 0.18 | 7.30 | 2.17 | 0.72 |
| Ex. 3 | ND | 0.42 | ND | 3.70 | 1.68 | 0.40 |
| Ex. 4 | ND | 0.35 | ND | 4.41 | 1.68 | 0.30 |
| Ex. 5 | ND | 0.50 | ND | 4.61 | 1.46 | 0.62 |

For Table 8, "Cx" indicates the branch length in branches/1000 total carbons (C1=methyl, C5=amyl branch, etc.). "ND" stands for a result of none detected or observed at the given limit of detection.

Ethylene-based polymers P1-3, although tested, are not included in the results of Table 8 because P1-3 did not exhibit C1-C6+ branching. This is expected as P1-3 are high crystallinity ethylene-based polymers that do not have any comonomer content that would produce short-chain branches in the range tested.

As observed in Table 8, the ethylenic polymer Examples 3-5 show no appreciable C1 (methyl) or C3 (propyl) branching and C2, C4, and C5 branching compared to Comparative Example 2. "Appreciable" means that the particular branch type is not observed above the limits of detection using the Nuclear Magnetic Resonance method (about 0.1 branches/1000 carbons), provided infra in the Testing Methods section. Comparative Example 2, a product of free-radical branching, shows significant branching at all ranges. In some embodiment ethylenic polymers, the ethylenic polymer has no "appreciable" propyl branches. In some embodiment ethylenic polymers, the ethylenic polymer has no appreciable methyl branches. In some embodiment ethylenic polymers, at least 0.1 units of amyl groups per 1000 carbon atoms are present. In some embodiment ethylenic polymers, no greater than 2.0 units of amyl groups per 1000 carbon atoms are present.

Figure 8:
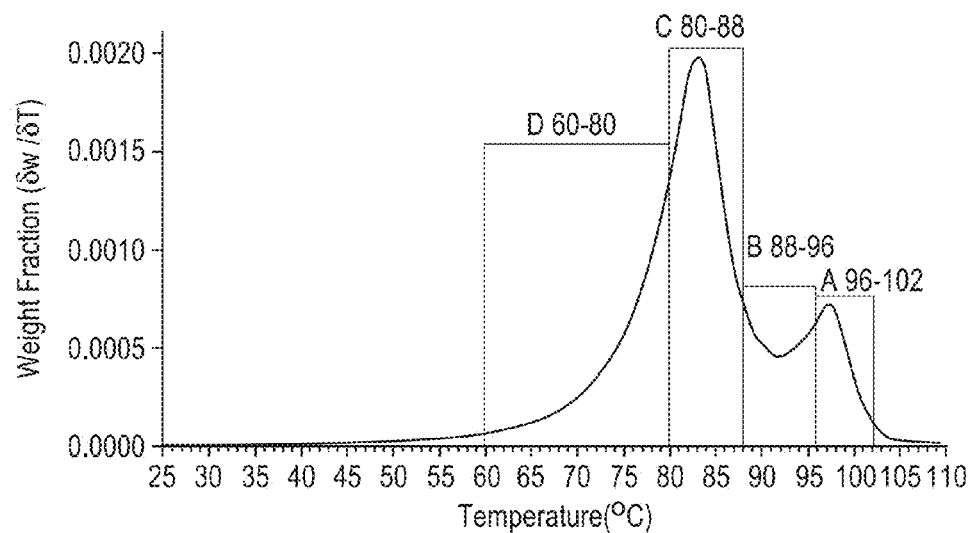
FIG. 8 represents the temperature splits for Fractions A-D using the Preparative Temperature Rising Elution Fractionation method on Example 3.

Samples of Examples 3-5 are separated into subfractions using the Preparative Temperature Rising Elution Fractionation method, provided infra in the Testing Methods section. The subfractions are combined into four fractions, Fractions A-D, before the solvent is removed and the polymers are recovered. FIG. 8 represents the temperature splits for Fractions A-D using the method on Examples 3-5.

The Fractions are analyzed for weight and their weight average temperature determined. Table 9 summarizes the weight fraction distribution of Examples 3-5 as well as Comparative Example 2 and gives each Fraction its designation A-D.

TABLE 9

Weight fraction percent and fraction weight average temperature for fractions of Examples 3-5.

| Sample ID | Fraction | Weight Fraction (wt %) | Fraction Weight Average Temperature (° C.) |
|---|---|---|---|
| Example 3 | A | 11.27 | 98.5 |
| | B | 11.32 | 93.1 |
| | C | 50.03 | 84.0 |
| | D | 27.38 | 73.1 |
| Example 4 | A | 15.76 | 98.4 |
| | B | 12.53 | 93.1 |
| | C | 46.80 | 83.9 |
| | D | 24.91 | 73.4 |
| Example 5 | A | 17.90 | 98.4 |
| | B | 17.79 | 93.4 |
| | C | 35.81 | 84.2 |
| | D | 28.50 | 71.5 |

As can be seen in Table 9, Examples 3-5 have a significant amount of polymer eluting at a weight average temperature greater than 90° C. For all three ethylenic polymer Examples there is at least one preparative TREF fraction that elutes at 90° C. or greater (Fraction A and Fraction B). For all three ethylenic polymer Examples at least 7.5% of the ethylenic polymer elutes at a temperature of 90° C. or greater based upon the total weight of the ethylenic polymer (Example 3: 22.59 wt %; Example 4: 28.29 wt %; Example 5: 25.69 wt %). For all three ethylenic polymer Examples at least one preparative TREF fraction elutes at 95° C. or greater (Fraction A). For all three ethylenic polymer Examples at least 5.0% of the ethylenic polymer elutes at a temperature of 95° C. or greater based upon the total weight of the ethylenic polymer (Example 3: 11.27 wt %; Example 4: 15.76 wt %; Example 5: 17.90 wt %).

Some of the Fractions are analyzed by triple detector GPC, and g' and gpcBR values are determined using the g' by 3D-GPC and gpcBR Branching Index by 3D-GPC methods, provided infra in the Testing Methods section. Comparative Example 2, Polymers 1-3, and representative weight ratio physical blends based upon the estimated composition of Examples 3-5 of respective Polymers and Comparative Example 2 are analyzed. The results are shown in Table 10.

which would usually be the temperature range reflective of high crystallinity and lack of LCBs. For ethylene-based polymers P1-3, the gpcBR value is at or near zero since they do not have any long chain branching. In addition, ethylene-based polymers such as P1-3 typically give a g' index close to 1.0 and an MH exponent close to 0.72. As the level of long chain branching increases, the g' index decreases from the value of 1.0; the MH exponent decreases from 0.72; and the gpcBR index increases from the value of 0. Conventional highly long chain branched ethylene-based polymer, such as CE2, does not produce a fraction with both high crystallinity and high levels of long chain branching.

TABLE 10

Analysis using 3D-GPC for molecular weights, distributions, and moments, g', and gpcBR for select Fractions of Examples 3-5, Polymers 1-3, and blends of P1-3 and CE2.

| | Conventional GPC | | | | Absolute GPC | | | | | | | |
|---|---|---|---|---|---|---|---|---|---|---|---|---|
| | Mn (g/mol) | Mw (g/mol) | Mz (g/mol) | Mw/Mn | Mw (g/mol) | Mz(abs) (g/mol) | Mz/Mw | Mw (Abs) Mw(GPC) | gpcBR | g' avg | MH | LCBf |
| Comparative Example 2 | 10,840 | 46,840 | 151,600 | 4.32 | 65,170 | 615,000 | 9.44 | 1.39 | 0.49 | 0.768 | 0.574 | 3.88 |
| P2 | 5,950 | 17,100 | 32,600 | 2.87 | 16,450 | 34,700 | 2.11 | 0.96 | 0.02 | 1.000 | 0.670 | 0 |
| Example 3 | 12,590 | 57,930 | 155,200 | 4.60 | 84,060 | 627,700 | 7.47 | 1.45 | 0.34 | 0.820 | 0.600 | 2.771 |
| Example 3 P-Tref Fraction 98.5° C. Fraction | 12,330 | 32,760 | 235,800 | 2.66 | 38,400 | 205,500 | 5.35 | 1.17 | 0.17 | 0.907 | 0.440 | 0.93 |
| Example 3 P-Tref Fraction 93.1° C. Fraction | 7,480 | 26,210 | 103,700 | 3.50 | 49,610 | 621,700 | 12.53 | 1.89 | 0.27 | 0.862 | 0.636 | 2.767 |
| Blend 67:33 CE 2/P 2 | 8,850 | 36,030 | 123,900 | 4.07 | 47,390 | 494,800 | 10.44 | 1.32 | 0.379 | 0.844 | 0.551 | 0.963 |
| P1 | 16,250 | 35,600 | 61,500 | 2.19 | 36,110 | 66,500 | 1.84 | 1.01 | 0.01 | 1.000 | 0.702 | 0 |
| Example 4 | 19,530 | 80,880 | 197,200 | 4.14 | 100,170 | 496,500 | 4.96 | 1.24 | 0.30 | 0.829 | 0.625 | 1.704 |
| Example 4 P-Tref Fraction 93.1° C. Fraction | 15,780 | 50,050 | 120,600 | 3.17 | 74,240 | 247,100 | 3.33 | 1.48 | 0.31 | 0.842 | 0.621 | 0.779 |
| Example 4 P-Tref Fraction 83.9° C. Fraction | 14,020 | 58.390 | 126,800 | 4.16 | 93,850 | 1,370,100 | 14.6 | 1.61 | 0.30 | 0.806 | 0.621 | 1.939 |
| Blend 67:33 CE 2/P 1 | 11,930 | 43,730 | 141,800 | 3.67 | 57,280 | 393,700 | 6.87 | 1.31 | 0.36 | 0.845 | 0.519 | 3.087 |
| P3 | 31,390 | 72,970 | 131,300 | 2.32 | 72,370 | 125,900 | 1.74 | 0.99 | −0.01 | 1.000 | 0.671 | 0 |
| Example 5 | 18,980 | 90,500 | 210,400 | 4.77 | 122,830 | 616,700 | 5.02 | 1.36 | 0.39 | 0.789 | 0.627 | 2.206 |
| Example 5 P-Tref Fraction 93.4° C. Fraction | 18,640 | 74,780 | 141,100 | 4.01 | 116,940 | 2,172,200 | 18.58 | 1.56 | 0.38 | 0.778 | 0.606 | 1.188 |
| Blend 67:33 CE 2/P 3 | 12,130 | 54,140 | 135,900 | 4.46 | 69,260 | 329,500 | 4.76 | 1.28 | 0.263 | 0.855 | 0.626 | 2.495 |

Table 10 show strong evidence of bonding between the ethylene-based polymers P1-3 and the highly long chain branched ethylene-based polymer formed in the reactor to form ethylenic polymers Examples 3-5. This can be seen in the absolute GPC molecular weight. Comparing the molecular weight averages from both conventional and absolute GPCs of the Examples with their respective physical blends as listed in Table 10 show the detected average molecular weights for the Examples are much higher than the blends, indicating chemical bonding.

The evidence of reaction is also strongly supported by the long chain branching indices. All the gpcBR values for the Examples show the presence of long chain branching in the high-temperature P-TREF Fractions (Fractions A and B), In analyzing the samples for methyls per 1000 carbons, it is necessary to combine Fractions into Fractions AB and CD to perform the Methyls per 1000 Carbons Determination on P-TREF Fractions procedure, provided infra in the Testing Methods section due to the small sample size. Fractions A and B are combined to give Fraction AB and Fractions C and D are combined to give Fraction CD. The new weight average temperatures for Fractions AB and CD are calculated in accordance with Equation 3.

Figure 9:
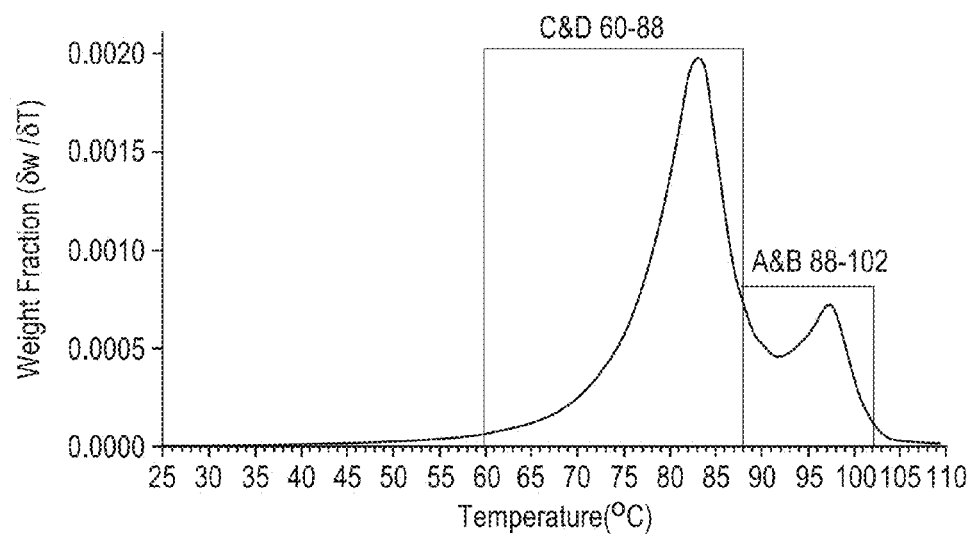
FIG. 9 represents the temperature splits for combined Fractions AB and CD of Example 3.
Figure 10:
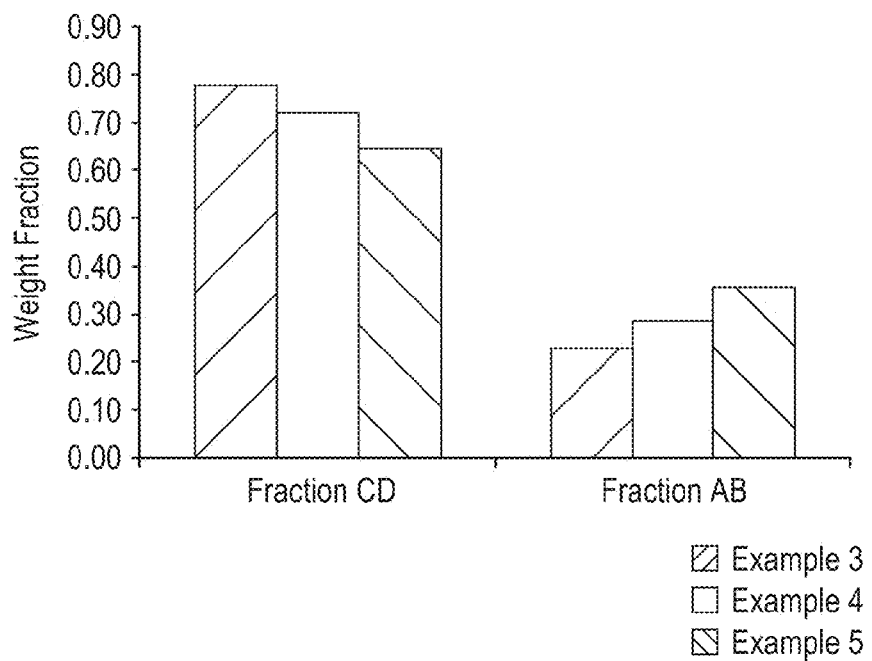
FIG. 10 represents the weight percentage of Fraction AB and CD for Example 3-5.
Figure 11:
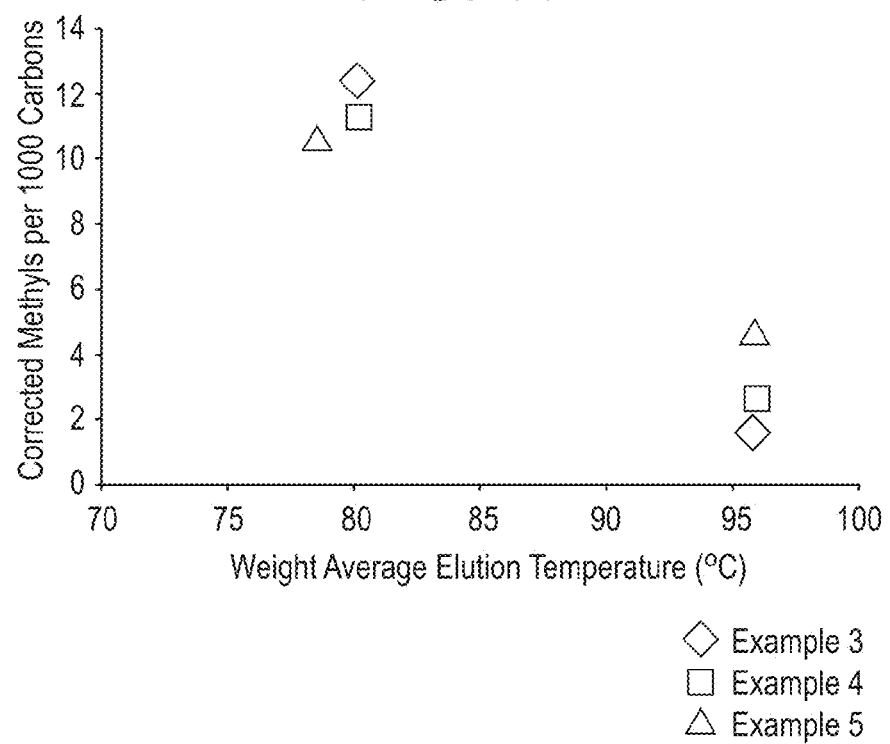
FIG. 11 is a plot of methyls per 1000 carbons (corrected for chain ends) versus weight average elution temperature as determined by Methyls per 1000 Carbons Determination on P-TREF Fractions analysis of Fractions AB and CD for Examples 3-5.

FIG. 9 represents the temperature splits for combined Fractions AB and CD of Examples 3-5. FIG. 10 and Table 11 shows the two larger Fractions and their weight fraction as a percentage of the whole polymer. Table 11 and FIG. 11 show the methyls per 1000 carbon results.

TABLE 11

Weight Fraction and Fraction Weight Average Temperature for Fractions of Examples 3-5.

| Sample ID | Fraction CD Temperature (° C.) | Fraction CD Weight Fraction | Fraction CD $M_n$ (GPC) | Fraction CD Corrected Methyls/ 1000C | Fraction AB Temperature (° C.) | Fraction AB Weight Fraction | Fraction AB $M_n$ (GPC) | Fraction AB Corrected Methyls/ 1000C |
|---|---|---|---|---|---|---|---|---|
| Example 3 | 80.15 | 0.77 | 18,288 | 12.4 | 95.80 | 0.23 | 17,562 | 1.6 |
| Example 4 | 80.29 | 0.72 | 33,760 | 11.2 | 96.02 | 0.28 | 33,515 | 2.6 |
| Example 5 | 78.57 | 0.64 | 24,470 | 10.5 | 95.90 | 0.36 | 58,201 | 4.6 |

Examples 3-5 show relatively high levels of branching in the high temperature fraction, Fraction AB, as indicated by the methyls per thousand values. FIG. 11 is a plot of methyls per 1000 carbons (corrected for end groups or methyls) versus weight average elution temperature as determined by Methyls per 1000 Carbons Determination on P-TREF Fractions analysis of Fractions AB and CD for Examples 3-5 using the data from Table 11. The high temperature Fractions of the ethylenic polymer Examples have higher than expected methyls per thousand carbons—higher numbers than would be expected from merely a linear ethylene-based polymer.

The results of Fast Temperature Rising Elution Fractionation testing shown in Table 12 also indicate strong evidence of long chain branching and grafting in Examples 3-5. This can be seen in the LS-90 measured $M_w$ shown. Comparing the $M_w$ of the Examples with their respective blends, the $M_w$ of the respective Examples are all much higher than the respective blends.

TABLE 12

F-TREF results for Examples 3-5, Comparative Example 2, P1-3, and several representative physical blends.

| | f-TREF Low-Melting Peak | | f-TREF High-Melting Peak | |
|---|---|---|---|---|
| Sample | Peak Temp. (° C.) | LS-90 Mw | Peak Temp. (° C.) | LS-90 Mw |
| Comparative Example 2 | 76.39 | 64,073 | ND | ND |
| P2 | ND | ND | 93.18 | 17,191 |
| Example 3 | 78.85 | 75,779 | 91.38 | 73,073 |
| Blend 67:33 CE 2/P2 | 75.29 | 47,532 | 92.52 | 46,766 |
| P1 | ND | ND | 94.87 | 33,888 |
| Example 4 | 80.61 | 90,571 | 92.88 | 87,853 |
| Blend 67:33 CE 2/P1 | 75.40 | 50,157 | 93.85 | 50,128 |
| P3 | ND | ND | 95.37 | 69,209 |
| Example 5 | 79.59 | 101,326 | 91.46 | 107,875 |
| Blend 67:33 CE 2/P3 | 75.27 | 46,459 | 94.49 | 56,928 |

Note that "ND" means not determined

Figure 13A:
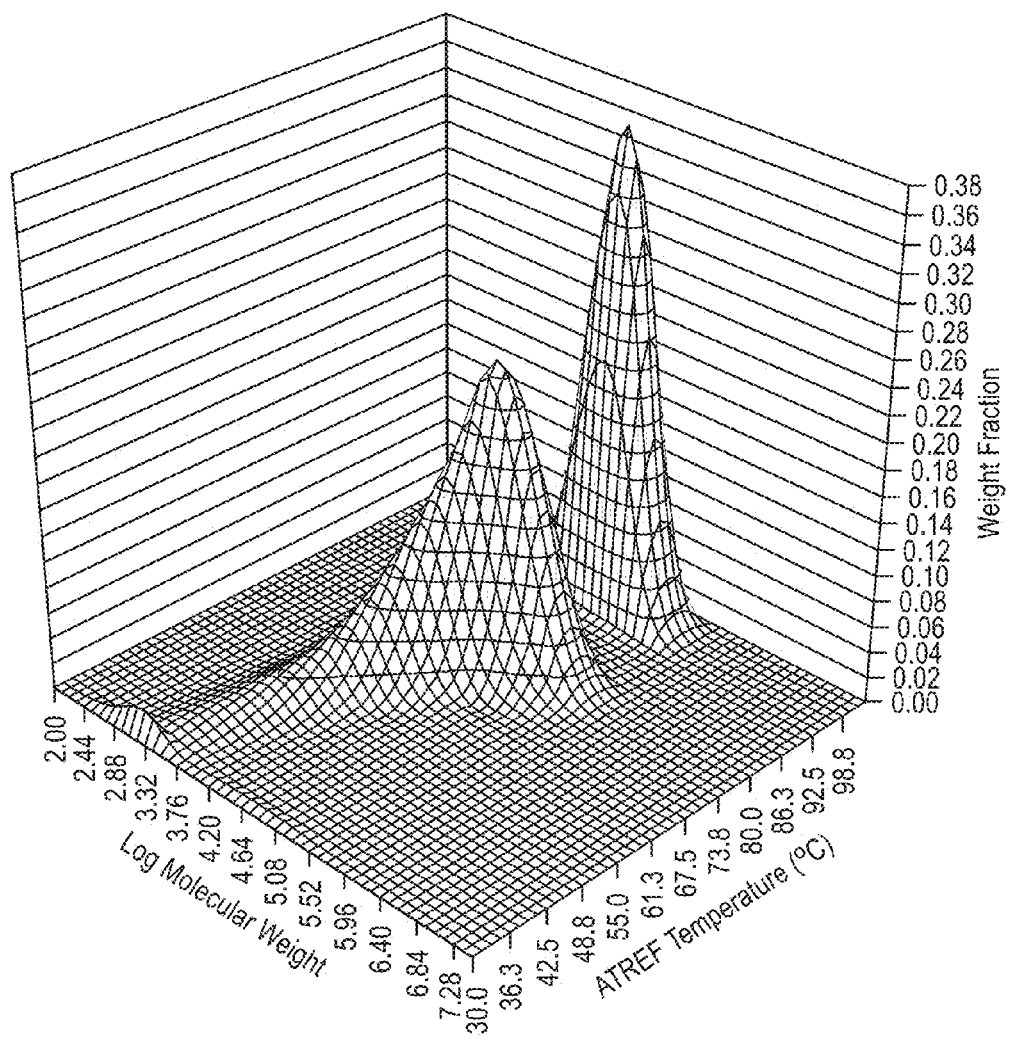
FIGS. 13(a) and (b) show discrete components for the blend sample, while FIGS. 13(c) and (d) show a continuous fraction (with no discrete components).
Figure 13B:
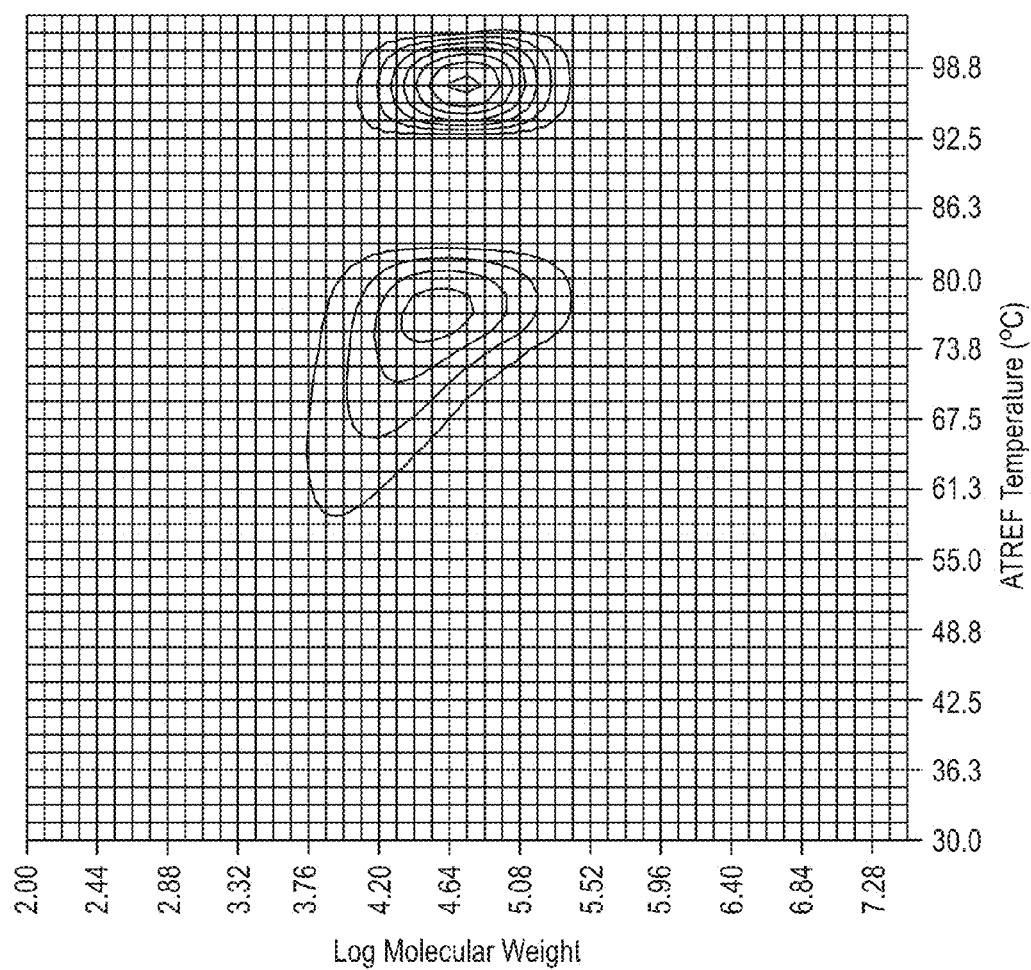
FIGS. 13 (a & b) and (c & d) are 3D and 2D infra red (IR) response curves for weight fraction eluted versus log molecular weight and ATREF temperature using the Cross-Fractionation by TREF method.
Figure 13C:
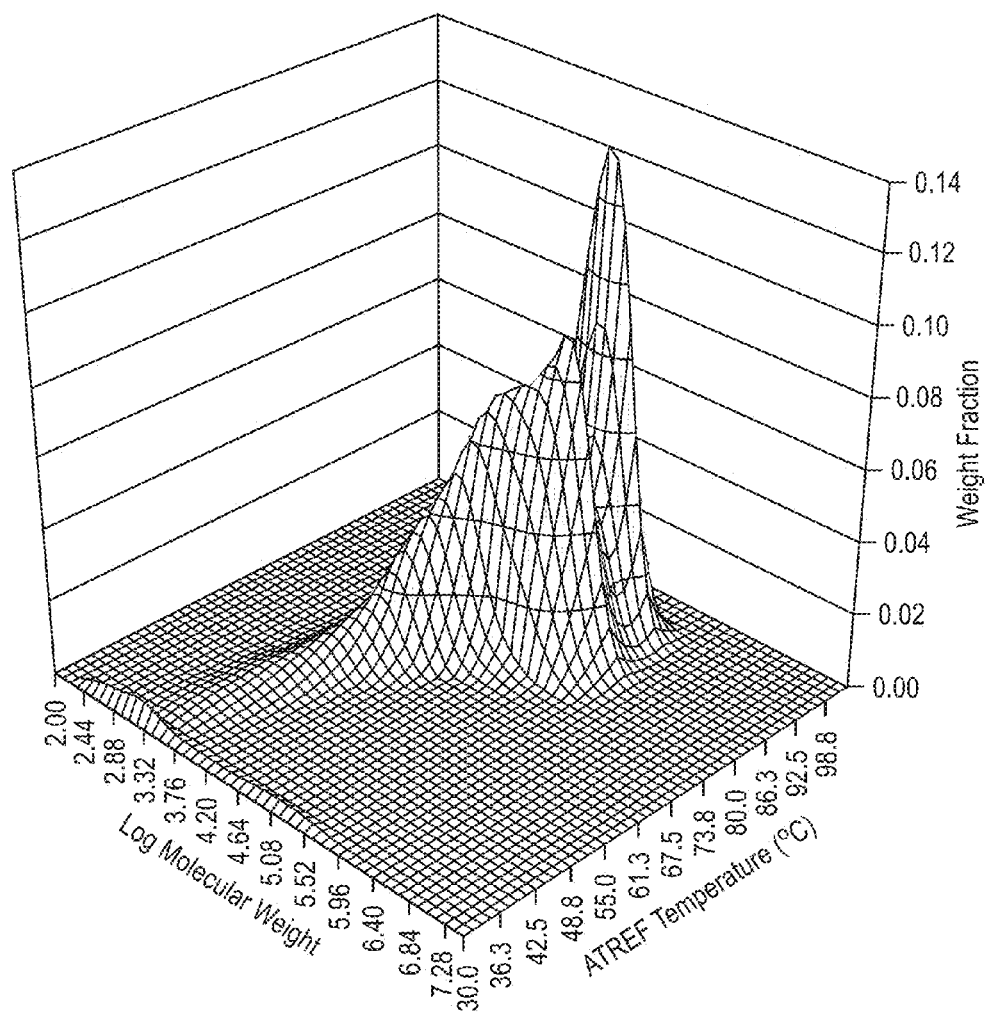
Figure 13D:
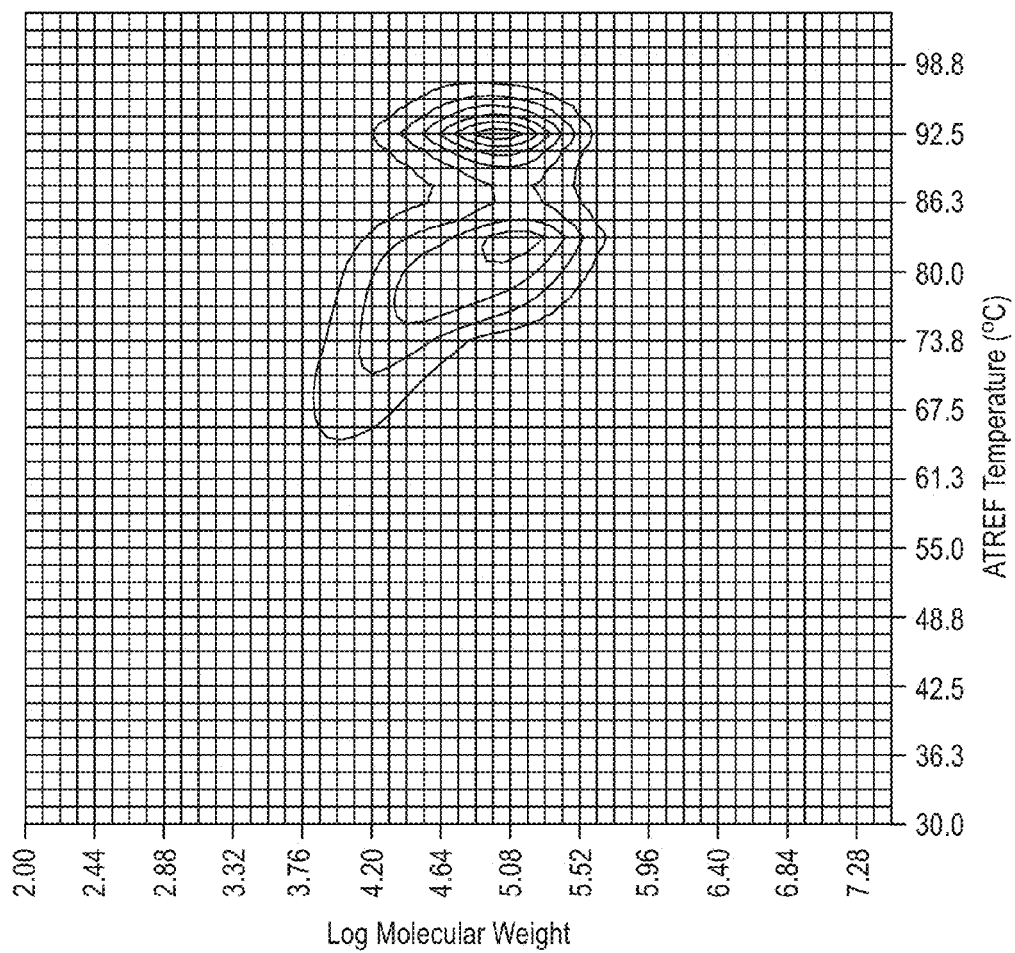

FIGS. 13(a) and 13(b) show a 3D and 2D IR response curve, respectively, cross fractionation result for a Polymer 3 and Comparative Example 2 33:67 weight ratio physical blend based upon the Cross-Fractionation by TREF method, provided infra in the Testing Methods section. FIGS. 13(c) and 13(d) show the IR response curve using the same method for Example 5 (which incorporates Polymer 3). FIGS. 13(a), (c), and (d) have a z-axis (Weight Fraction) in increments of 0.02, represented not only by grid lines (3D view only) but also by color bands (both 3D and 2D view). The z-axis increments for Weight Fraction in FIG. 13(b) are set at 0.05 to assist in viewing the 2D representation.

Comparing the two sets of graphs, it can clearly be seen that the blend components of FIGS. 13(a) and 13(b) are well resolved into two distinct "islands" of temperature elution versus molecular weight, indicating the bimodal nature of the blend. FIGS. 13(c) and 13(d) show Example 5 and how the ethylenic polymer does not completely resolve, indicating a single polymeric material. Also noteworthy is that the molecular weights of the components of the blend are significantly lower than the corresponding constituents of Example 5, which can be observed by comparing FIG. 13(b) with FIG. 13(d).

'While the embodiments have been described with particularity, it will be understood that various other modifications will be apparent to and can be readily made by those skilled in the art without departing from the spirit and scope of the invention. Accordingly, it is not intended that the scope of the claims to be limited to the examples and descriptions set forth but rather that the claims be construed as encompassing all the features of patentable novelty which reside in the present invention, including all features which would be treated as equivalents by those skilled in the art to which the invention pertains.

It is intended that the disclosure of preferred or desired, more preferred or more desired, highly preferred or highly desired, or most preferred or most desired substituents, ranges, end uses, processes, or combinations with respect to any one of the disclosed compositions and methods is applicable as well to any other of the preceding or succeeding embodiments of the disclosed compositions and methods, independently of the identity of any other specific substituent, range, use, process, or combination.

Unless otherwise stated, implicit from the context or conventional in the art, all parts and percentages are based on weight.

All applications, publications, patents, test procedures, and other documents cited, including priority documents, are fully incorporated by reference to the extent such disclosure is not inconsistent with the disclosed compositions and methods and for all jurisdictions in which such incorporation is permitted.

Depending upon the context in which such values are described, and unless specifically stated otherwise, such values may vary by 1 percent, 2 percent, 5 percent, or, sometimes, 10 to 20 percent. Whenever a numerical range with a lower limit, RL, and an upper limit, RU, is disclosed, any number falling within the range, including the limits themselves is specifically disclosed. In particular, the following numbers within the range are specifically disclosed: R=RL+ k*(RU−RL), wherein k is a variable ranging from 0.01 to 1.00 with a 0.01 increment, that is, k is 0.01 or 0.02 to 0.99 or 1.00. Moreover, any numerical range defined by two R numbers as defined is also specifically disclosed.

We claim:

1. A process, comprising:
A) polymerizing ethylene in the presence of a catalyst to form a linear ethylene-based polymer having a crystallinity of at least 50% as determined by DSC Crystallinity in a first reactor or a first part of a multi-part reactor; and B) reacting the linear ethylene-based polymer with additional ethylene in the presence of a free-radical initiator to form an ethylenic polymer in at least one other reactor or a later part of a multi-part reactor.

2. The process of claim 1, where the reaction of step (B) occurs by graft polymerization.

3. The process of claim 1, where the catalyst of step (A) is a metallocene catalyst.

4. The process of claim 3, where polar compounds, if present in the first reactor or the first part of a multi-part reactor, do not inhibit the activity of the metallocene catalyst.

* * * * *